United States Patent [19]
Chennaux

[11] Patent Number: 6,082,069
[45] Date of Patent: Jul. 4, 2000

[54] METHOD FOR MAKING A RIGID CONSTRUCTION BY WEDGING TOGETHER PANELS AND FRAMES WITHOUT USING TOOLS

[76] Inventor: Alain Chennaux, 12 rue Henri-Wafelaerts, Brussels 1060, Belgium

[21] Appl. No.: 08/836,690

[22] PCT Filed: Oct. 26, 1995

[86] PCT No.: PCT/BE95/00098

§ 371 Date: May 2, 1997

§ 102(e) Date: May 2, 1997

[87] PCT Pub. No.: WO96/14000

PCT Pub. Date: May 17, 1996

[30] Foreign Application Priority Data

Nov. 3, 1994 [BE] Belgium .................................. 9400993

[51] Int. Cl.[7] .................................................. A47G 29/00
[52] U.S. Cl. ........................ 52/648.1; 52/745.19; 52/779; 29/462; 29/897.31; 108/193; 312/265.2
[58] Field of Search ............................... 52/581, 578, 660, 52/633, 648.1, 745.19, 747.1, 762, 763, 779, 781, 781.5; 108/157.13, 157.16, 158.12, 180, 193; 312/265.2, 265.3, 265.4, 265.5, 265.6; 29/432, 462, 896.6, 897.31, 897.312, 897.32

[56] References Cited

U.S. PATENT DOCUMENTS

| | | | |
|---|---|---|---|
| 1,481,560 | 1/1924 | Ringer | 312/265.5 X |
| 3,285,684 | 11/1966 | Duncan | 312/265.3 |
| 3,612,289 | 10/1971 | Zink | 108/180 |
| 3,784,273 | 1/1974 | Nikolai | 312/265.3 |
| 3,855,748 | 12/1974 | Thomas | 52/578 |
| 4,153,311 | 5/1979 | Takahashi | 312/265.5 X |
| 4,182,244 | 1/1980 | Hutchins, Jr. et al. . | |
| 5,117,989 | 6/1992 | Ross | 108/180 X |
| 5,454,331 | 10/1995 | Green | 108/193 X |

FOREIGN PATENT DOCUMENTS 2 629 756  4/1988  France .

*Primary Examiner*—Carl D. Friedman
*Assistant Examiner*—Kevin D. Wilkens
*Attorney, Agent, or Firm*—Leonard Bloom

[57] ABSTRACT

A method for assembling an object useful for storage, support or shelter. The assembly essentially consists of at least two planar parallel rectangular members in which a plurality of free four-sided spaces are provided so that a network of empty four-sided spaces are formed in the plane of each member. The method comprises the step of inclined insertion and wedging with force of panels in the free spaces, until perpendicularity of the edges of the panels to the planar rectangular members is achieved, the wedging resulting from the forced gripping of the edges of the free spaces by notches or grooves provided on the panels.

16 Claims, 37 Drawing Sheets

METHOD FOR MAKING A RIGID CONSTRUCTION BY WEDGING TOGETHER PANELS AND FRAMES WITHOUT USING TOOLS

The invention relates to a method of assembly for a rigid structure and the resulting rigid structure, for example a bookcase.

The methods utilises square or rectangular panels and chassis in the form of a frame, in the form of ladders or in the form of trellises.

BACKGROUND

The state-of-the-art in matters of assembly of current materials that are easily transformable, in order to obtain a structure rendered rigid by wedging, in other words without the utilization of tools or other accessories, does not show any method that enables the quick construction of a self-supporting structure that exhibits a satisfactory rigidity.

By way of illustration, reference is made to the document FR-A-2629756 (LE GOURRIEREC) that describes a manufacturing method for furniture in semi-rigid flat materials. The manufacture of such furniture or structures requires cutting up, the assembly is very fast but gluing is necessary. In the type of assembly according to the document mentioned above, various operations are implemented for cutting to size strips of material of determined thickness, for folding the strips thus cut, in order to obtain adequate forms corresponding to the piece of furniture to be made. The semi-rigid material can be corrugated cardboard, in particular for making small sized structures, a plastic material such as polyethylene, expanded polystyrene, etc., a composite material, peeled wood, a metal such as honeycomb structured aluminium, etc.

The state-of-the-art is on the other hand also described by the document U.S. Pat. No. 4,182,244 (Hutchins and Gebnard) relating to a unit whose assembly is formed by four reinforcing bars to which four square panels are perpendicularly attached. The modular unit is formed, preferably, of very thick cardboard. It includes a plurality of panels which are adapted for fitting one above the other and each panel comprises a horizontal rectangular plate. The materials required here, are numerous and diverse. The major inconveniences of these structures are the possibility of global flow of the unit and/or of collapse under the effect of the weight and/or stresses due to shocks to which the framework structure is subjected by storage.

PURPOSE AND ADVANTAGES OF THE INVENTION

The objective of the present invention is to provide a rigid structure according which can be assembled with bare hands in others words the operator works without tools, without nails, without adhesive, without screws or other hardware accessory; assembly is very fast and the final structure exhibits a rigidity marked by pitch and/or roll. On a straight floor, the structure according to the invention is directly and perfectly plumb while exhibiting a great economy of material in relation to its final volume. Because of this the structure according to the invention is light.

The basic materials required for the construction of the structure according to the invention are flat and, consequently their packaging and their transport are very easy. Furthermore, the materials in question are readily available on the market in the form of flat panels, in various materials such as wood, cardboard, metal, expanded polystyrene, plexiglass, glass, etc. . . . In final state, when it has been assembled, the structure enables a set of cables, wires, pipes and lighting accessories to be easily dissimulated in the lattice of its uprights.

Each structure is, in fact an independent entity that can very easily be linked with another identical one and be extended by module in all directions.

On the other hand, the actual manufacturing of the chassis and the squared or rectangular panels which are the basic structural elements, requires neither abundant manual work, nor complicated tools, because they result, for the greater part from a simple operation of sawing, hollow punching or molding. After assembly, the dismounting of the structure is particularly easy, without major alteration to its components.

SUMMARY OF THE INVENTION

The invention relates to a method for assembling an object useful for storage or support. The assembly essentially consists of at least two planar parallel rectangular members in which a plurality of free empty four-sided spaces are provided so that a network of empty four-sided spaces are formed in the plane of each member. The method comprises the step of inclined insertion and wedging with force of panels in the free spaces, until perpendicularity of the edges of the panels to the planar rectangular members is achieved, the wedging resulting from the forced gripping of the edges of the free spaces by notches or grooves provided on the panels.

DESCRIPTION OF THE INVENTION

The invention will be better understood if it is perceived that it relates among others to a method of assembly for an alveolated dismountable three-dimensional rigid structure from at least two chassis in the form of a single frame (whose upper and lower parts are hereafter called rungs), in the form of a ladder or trellis, in other words ladders with monobloc joined uprights or uprights joined by any mechanical means and at least two rectangular panels respectively for each space between the rungs of the aforesaid chassis.

Using a more conceptual wording, the method of the invention is characterized in that a cube, whose surface is limited to 2, 3 or 4 faces, such faces being produced or not by cutting out of different panels, has the function of keeping the two or several chassis vertical, on the one hand by wedging the aforesaid panels and on the other hand, by the intrinsic rigidity of the panels.

According to the invention, the assembly between chassis and panels is effected by the inclined insertion and by wedging with force, in the empty spaces present in the chassis, of the aforesaid panels perpendicular to the plane of the chassis. The wedging of the panels—and consequently the rigidification of the whole structure—results from the forced righting of these same panels until their vertical section is parallel and tangent to the uprights of the chassis, the height of the aforesaid panels being slightly greater than the space separating two rungs, whether this space is the distance separating two consecutive rungs, the actual distance separating a rung and the thickness of a base panel resting on the opposite rung or ultimately is the actual distance separating a base panel and an opposite top cover.

The method is specific in that the distance between the chassis of the structure depends on the location of the notches and/or of the grooves provided above and/or below and/or possibly along the panels, the total depth of the aforesaid structure being equal to the distance between the chassis added to the greatest projecting strip of the panels protruding in front and behind the uprights and the rungs of the chassis.

It will be understood that the essential advantage of the invention is to make available to the private individual who possesses few tools a true method of erection of a structure for various purposes.

According to a preferred embodiment, the structure assembled according to the method of this invention has the original feature that a single operation enables the easy and simultaneous manufacture, of the necessary elements: chassis and associated panels cut-out from these chassis. This way of manufacturing the elements to be assembled is advantageous due to the absence of substantial waste of material. Cut-out panels are produced by sawing, hollow punching, LASER cutting and analogues. The main original material for manufacturing the structure according to this preferred embodiment being consequently, two or three identical original panels whose width and length determine the width and height of the structure.

It is a further object of the invention to provide a rigid tridimensional structure made of flat parallel chassis comprising openings with edges forming rungs connecting two uprights, and comprising at least two base panels provided with notches or grooves, located perpendicularly to the plane of the chassis, and fixedly interconnecting the said chassis at least by wedging, the notches or grooves of the panels gripping the edges of said empty spaces.

It is another object of the invention to provide a rigid tridimensional structure made of flat parallel chassis provided with edges and empty spaces forming rungs and uprights, and of lateral and base panels located perpendicularly to the plane of the chassis, wherein the lateral panels are tangent to the upright of the chassis and provided with upper notches gripping the cut edge of a rung of the chassis, and rest on base panels perpendicular to the uprights of the chassis, said base panels being provided with notches gripping the cut edge of the chassis.

The diversity of construction of the structures is indeed remarkable owing to the fact that the number of panels and the number of chassis can be combined.

The combination of the elements is essentially effected by following a fundamental manner of working such a one of the following ways:

2 panels for each space between the rungs of the chassis and two or more chassis.

3 panels for each space between the rungs of the chassis and two or more chassis.

4 panels for each space between the rungs of the chassis and two or more chassis.

The different ways of combining the panels and the chassis constitute different embodiments of the invention and are discussed here by way of nonrestrictive example.

It will nevertheless be understood that the structure assembled according to the first above embodiment may serve to construct a partition or an openwork wall in the same way as constructing a beam, in the spaces of which, a central cross may be inserted with the purpose of increasing the mechanical resistance.

Likewise the structure assembled according to the second embodiment may serve to construct a partition or an openwork wall, or the essence of these two entities, in the same way as constructing a beam, a bookcase or a storage unit for which the sides, a base, a cover and sliding or hinged doors can be added, and finally, with the help of a couple of chassis/frames, for constructing a chest by the addition of two sides inserted along four grooves.

It is also conceivable that the structure assembled and obtained according to the third embodiment of combining panels and the chassis serves to construct a partition or an openwork wall, in the same way as constructing a beam, a bookcase or a storage unit for which the sides, a base, a cover and sliding, hinged or pivoted doors can be added and also finally serves, after adding two or three impermeable sides and locking strips, to construct a strippable casing for concrete or any other moldable material, which, after stripping, leaves the three-dimensional form of the original structure less the thickness of the chassis, the thickness of the panels and of the part of the projecting strips protruding past the uprights and the rungs of the chassis.

It is perfectly feasible that the structure according to the invention can be made permanent and non-dismountable by operations of gluing, screwing, nailing or by any other mechanical operation carried out on its various components.

Other purposes, advantages and characteristics will appear from the description of one possible embodiment of this invention given by way of nonrestrictive example, on the basis of the attached drawings in which, the elements designating the same constructive realities are designated throughout by the same letter or the same reference number for reasons of simplicity:

FIGS. 4a to 4i represent the main assembly phases of a storage unit (FIGS. 4a to 4i) and of a casing for concrete (FIGS. 4a to 4g), the starting elements being four cut-out panels provided with notches and grooves and two chassis.

Figure 1:
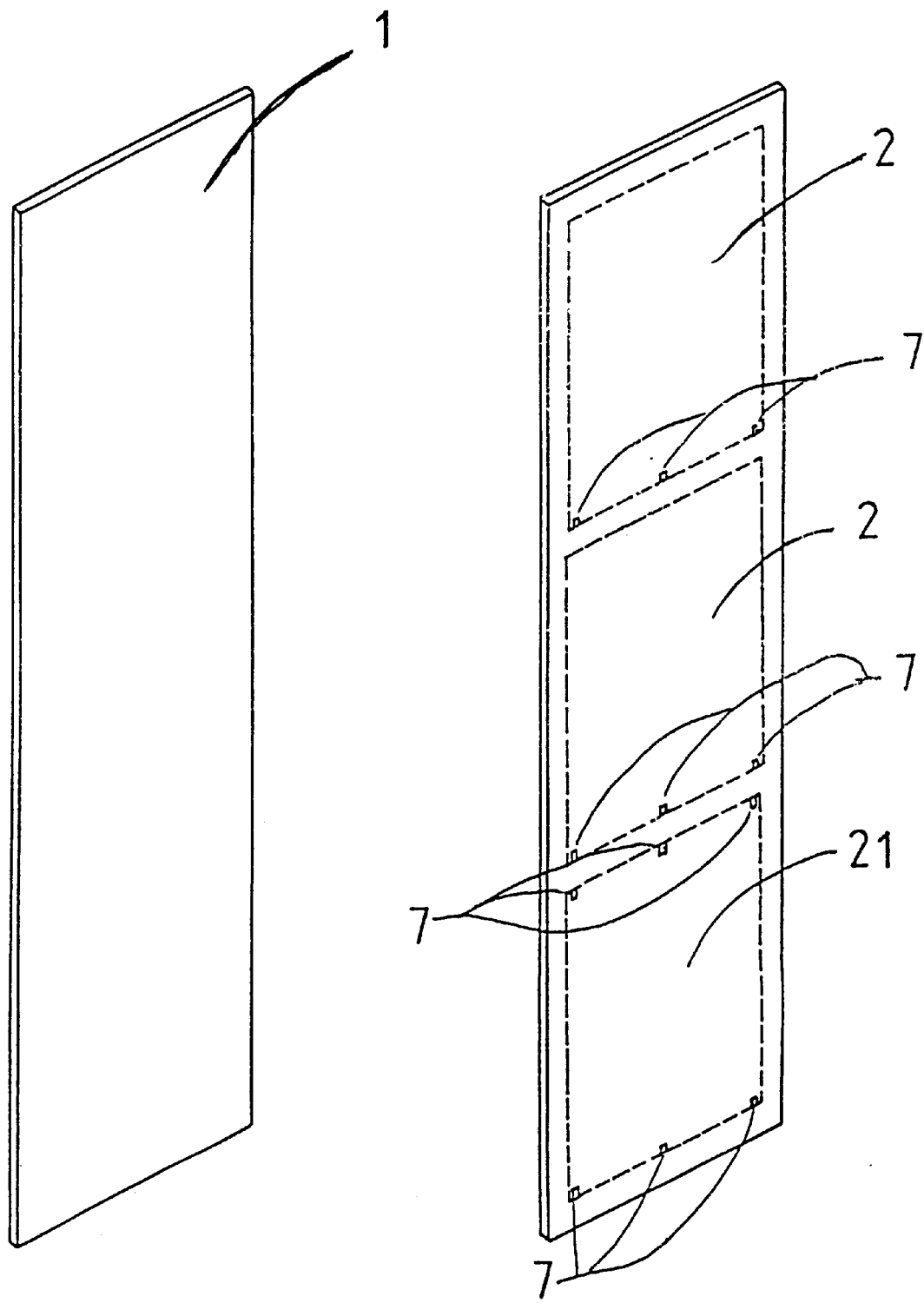
FIGS. 1a to 1e are the illustration of a preferred embodiment wherein there is a simultaneous manufacturing phase of the chassis and associated cut-out panels, in the nonrestrictive case where use is made of three chassis associated with three cut-out panels provided with notches.
Figure 1:
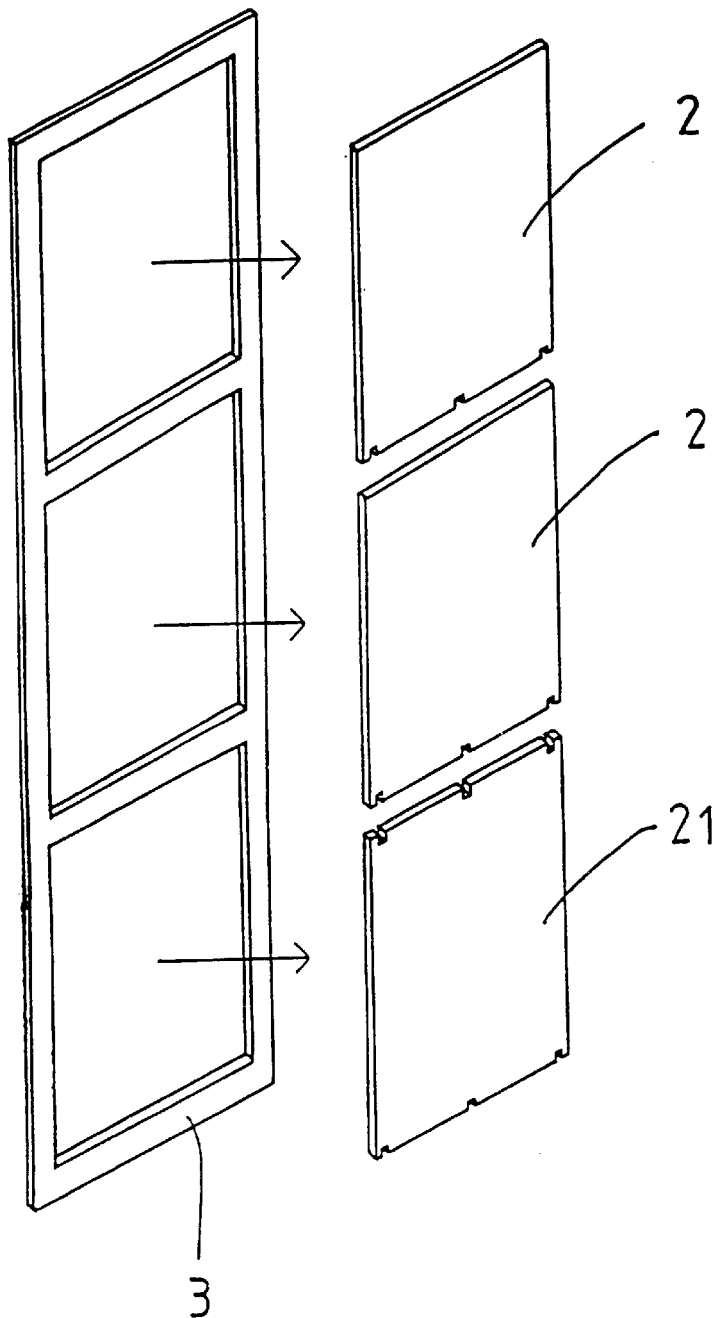
Figure 1C:
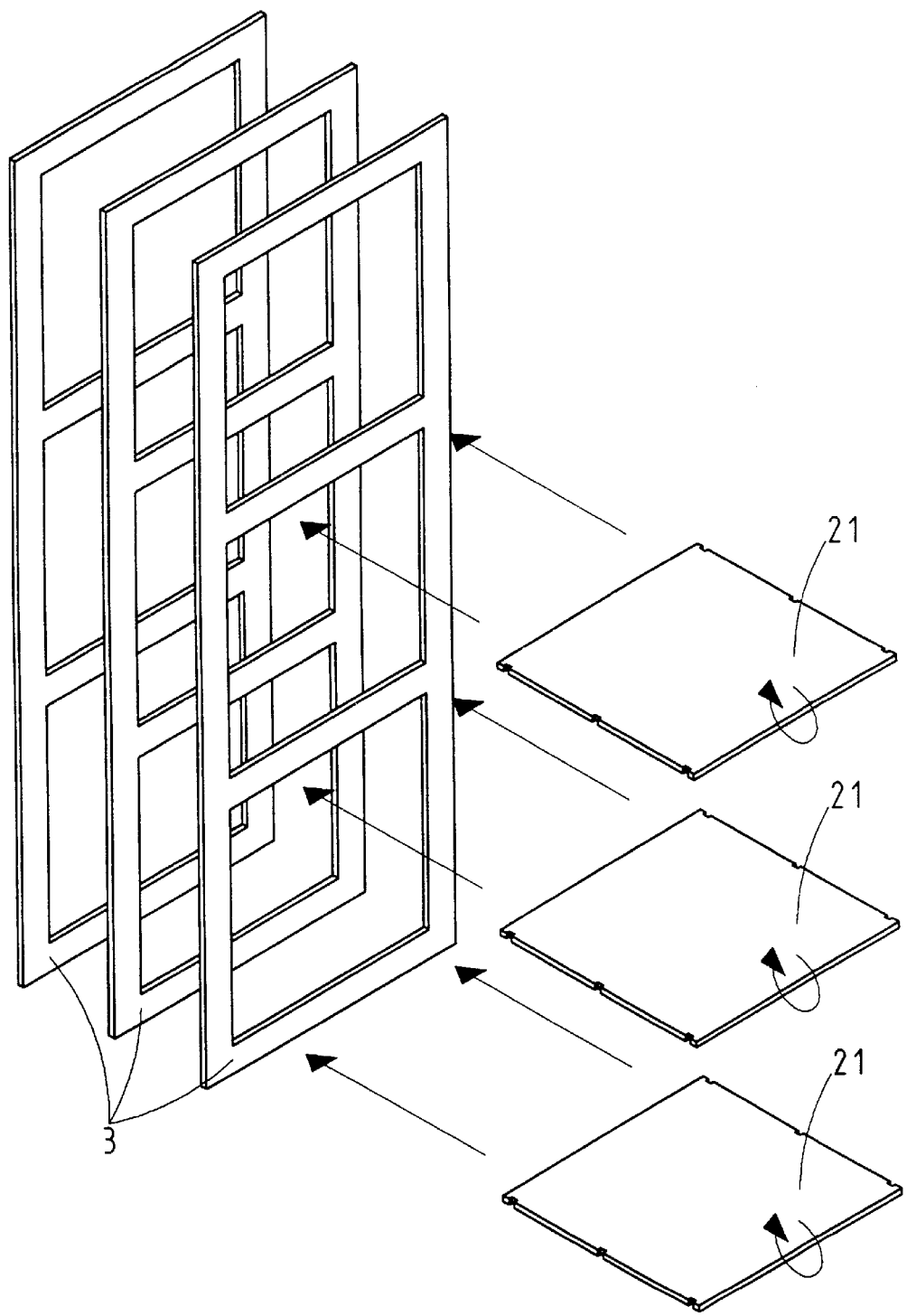

In FIGS. 1a–1e, the original panel 1 is represented successively. As is clear from FIG. 1a, this panel is cut up into two cut-out panels 2 each provided with three notches 7, and into a base 21 provided with six notches. The material within the notches is discarded and constitutes the only waste material. The panel is, in fact cut out in such a manner as to create rectangles very little geometrically different from true squares. The length of the rectangles provided is precisely equal to the length of a true square increased by twice the depth of a notch 7 of the base plate 21. Thus the structure comprises rectangular panels the length thereof being equal to the height thereof plus twice the depth of the notches provided on said panels. The reason for which notches can be provided in the base 21 resides in the fact that when placing bases in the chassis 3, they are placed in such manner that their lengths are oriented in perpendicular direction to the direction of this length when it is cut out. The depth of the notches 7 greater than the side panels is equal to the thickness of the base plate decreased by a minute quantity enabling the wedging of the lateral panel in the space constituted by the upper surface of the base and the rung of the chassis 3.

FIG. 1b shows very clearly that the panel 1 disassociated from the cut-out panels 2 and from the base 21 gives the chassis 3. This fast cutting-up operation into three cut-out panels provided with notches 7 is repeated three times from three separate panels 1.

Figure 1D:
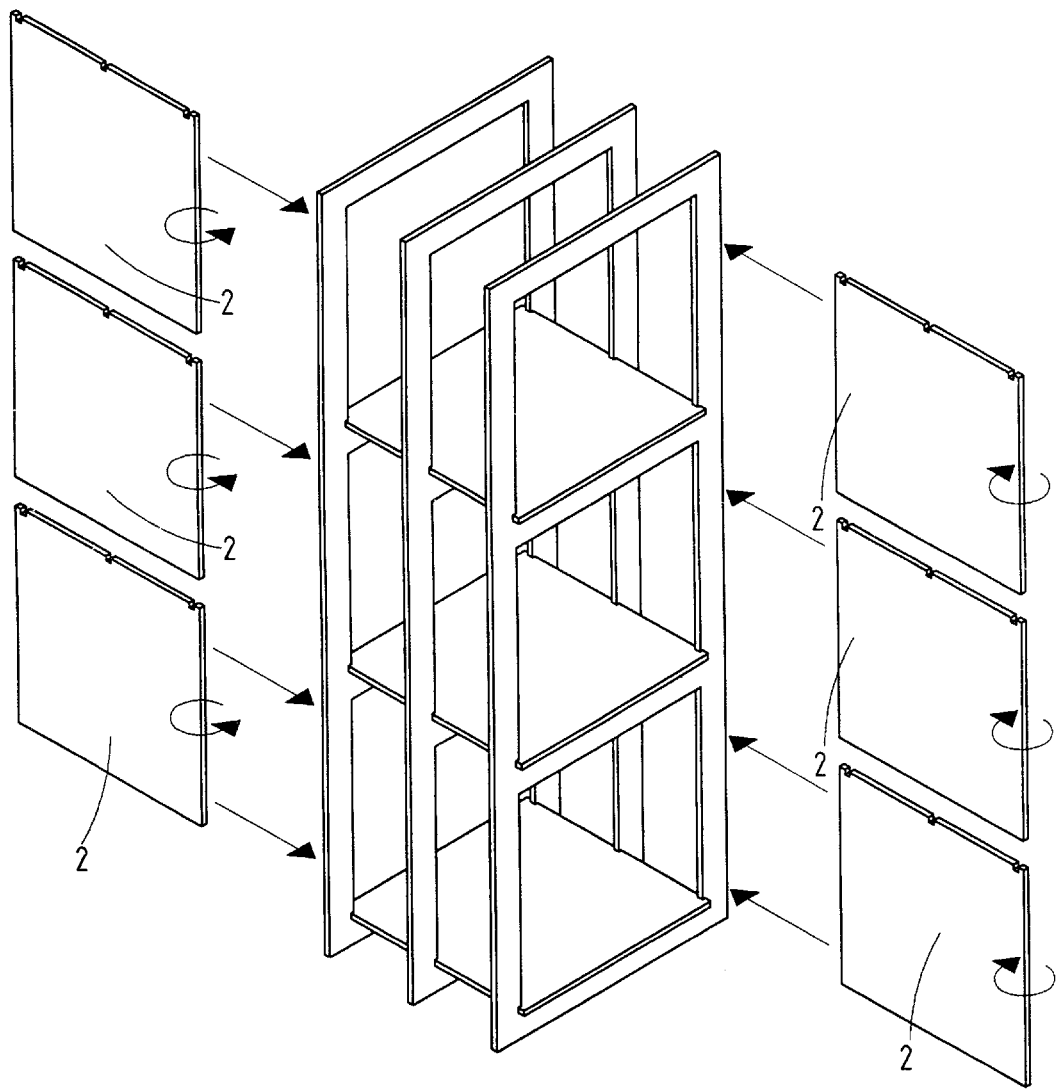

The three resultant chassis 3 are disposed in a parallel direction and the three base plates 21 are inserted in such manner that their length is opposite the width of the cut-out made in the panel 1. At the end of the operation, each upright of each chassis 3 is wedged with the help of notches 7 as can be seen very clearly in FIG. 1d. In FIG. 1d, it can be seen that, the three chassis being provided with their bases 21, the cut-out panels are inserted left and right, by holding them inclined, the notches 7 are placed in the upper rungs of the three chassis and they are righted until they are tangent to the uprights of the chassis 3.

In that manner the desired wedging of prime importance for the stability of the whole structure, is obtained.

Figure 1E:
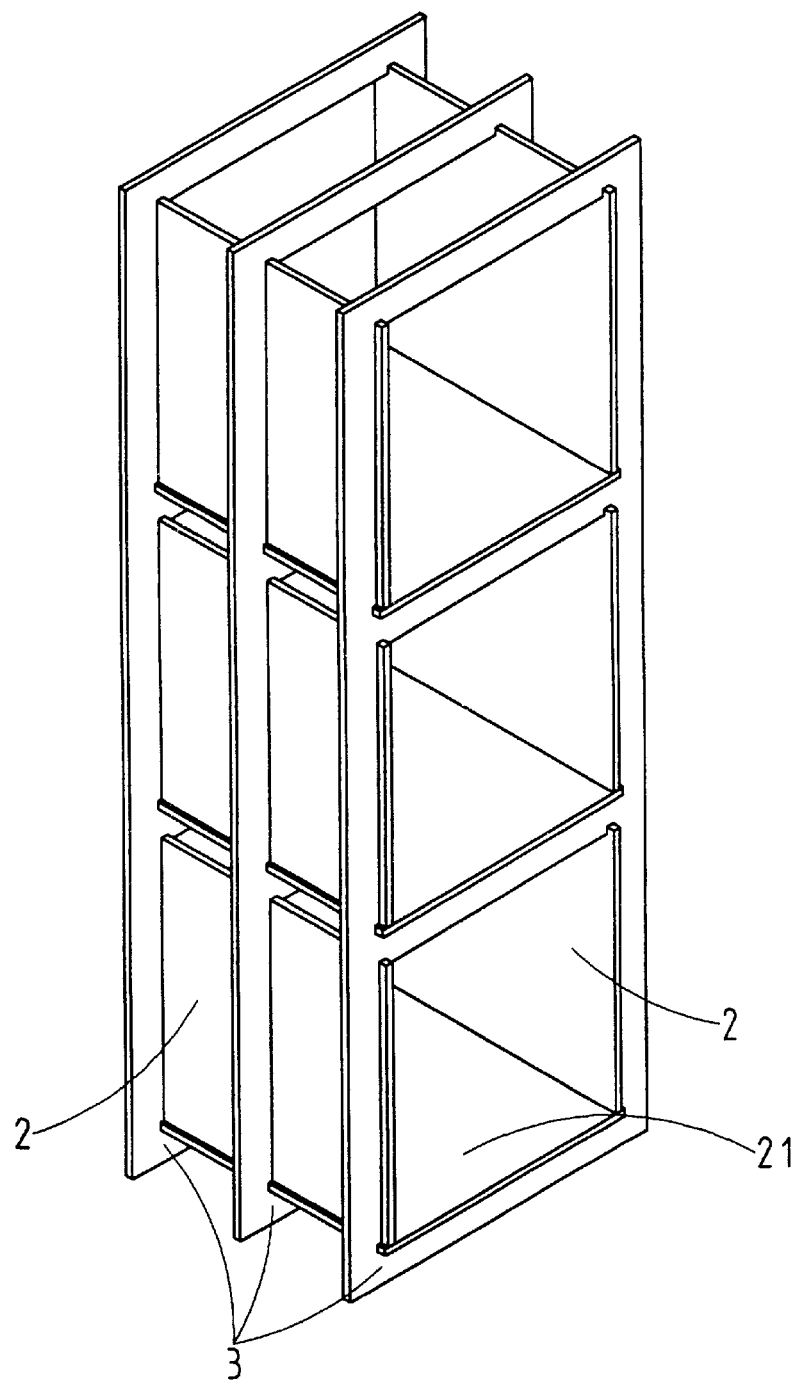

Finally a configuration illustrated in FIG. 1e, is obtained.

Figure 2A:
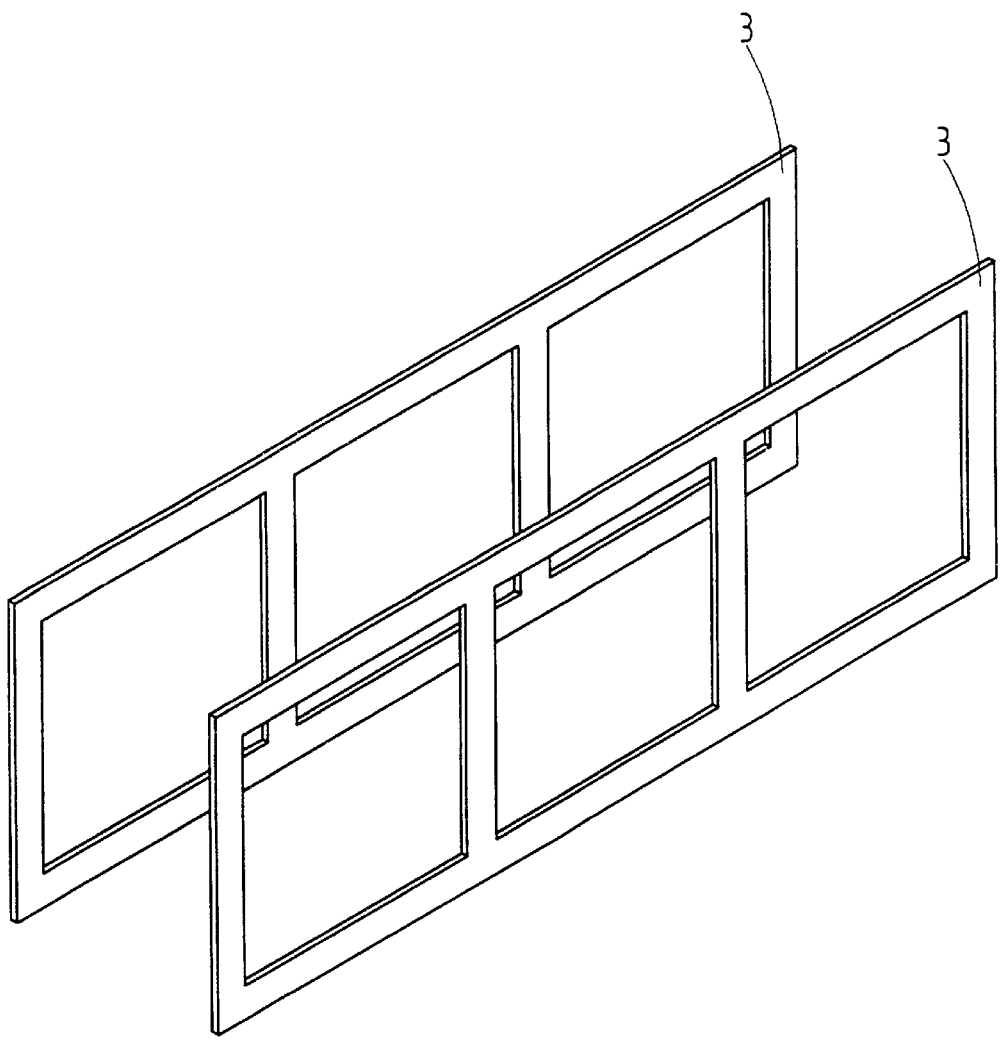
FIGS. 2a to 2e are an illustration of the manufacturing phases of a beam, an openwork wall or a partition from two chassis associated with two cut-out panels provided with notches and grooves.
Figure 2B:
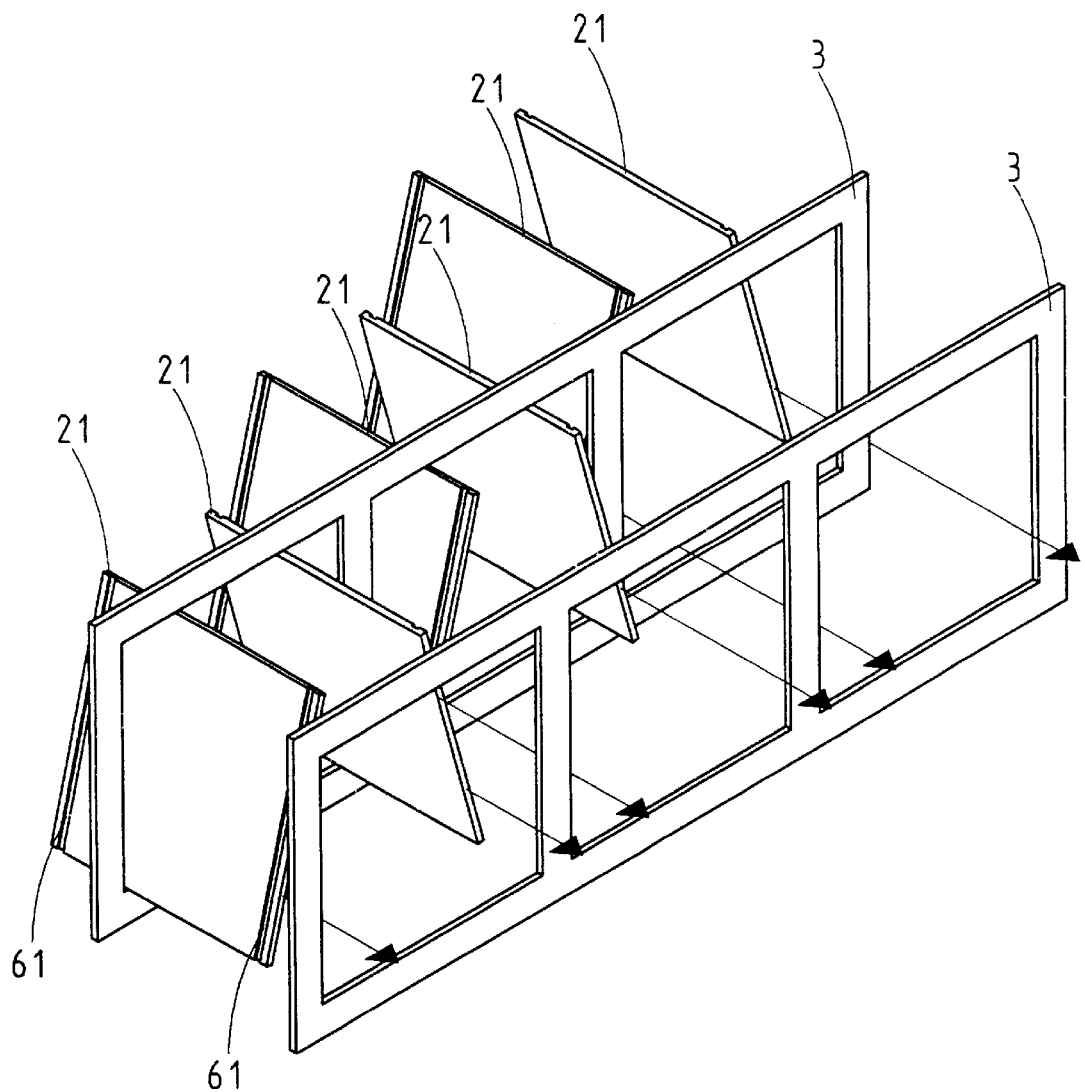

In FIGS. 2a–2e, an embodiment of a beam or a partition (linking of righted beams) is illustrated. Use is again made of the chassis (in this case two chassis). In the following described embodiments, the procedure is according to FIG. 1 or the chassis can be assembled and the panels cut out separately. In FIG. 2b, grooves 61 are represented which are associated with the notches 7 in the same way as in all the subsequent figures. It should be noted that the grooves 61 can be associated with the notches 7 just as well in FIG. 1 as in the other figures provided.

Figure 2C:
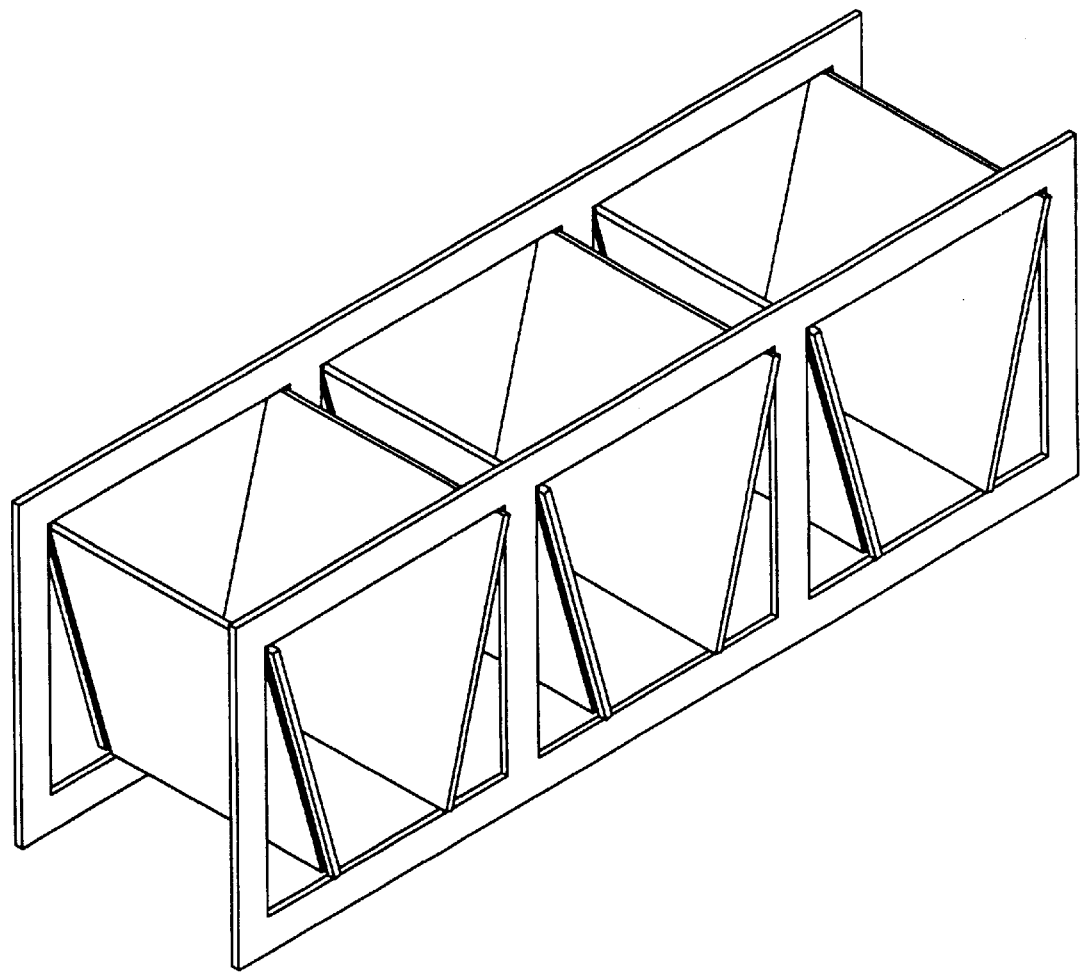
Figure 2D:
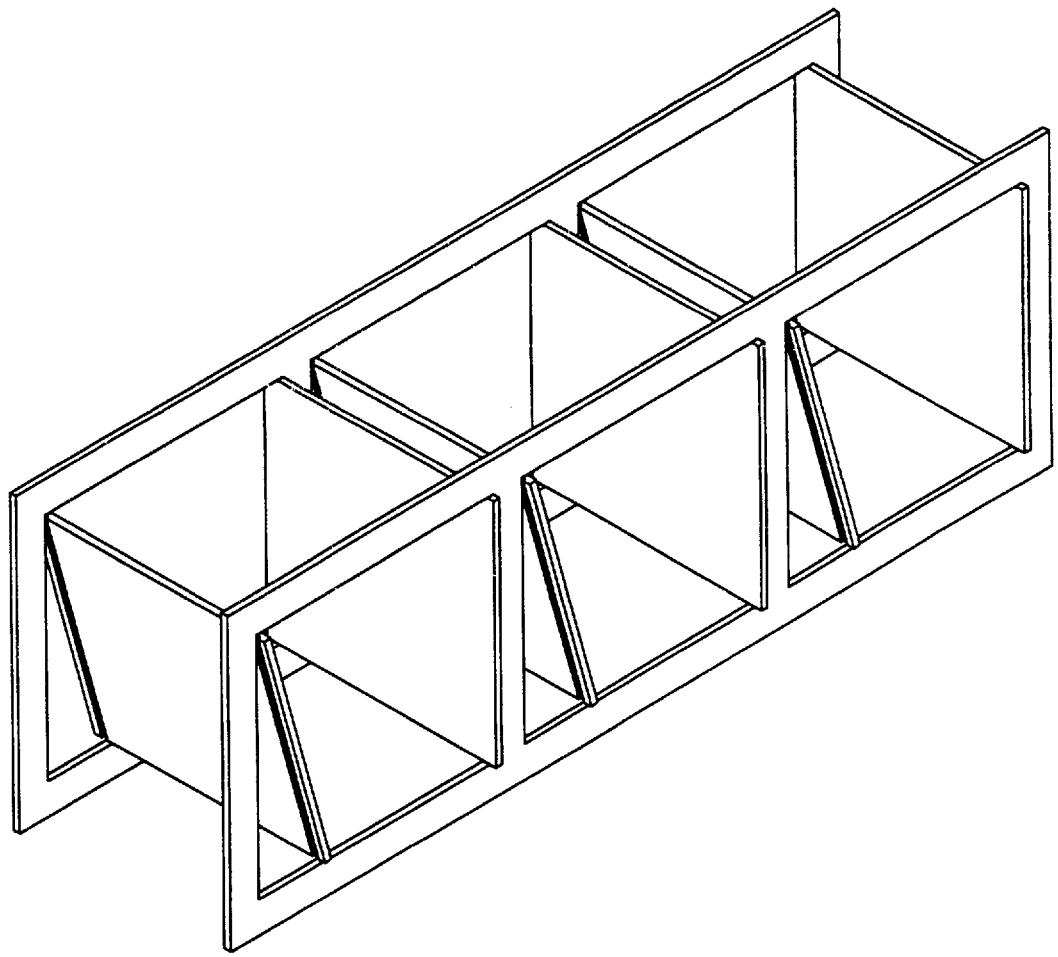
Figure 2E:
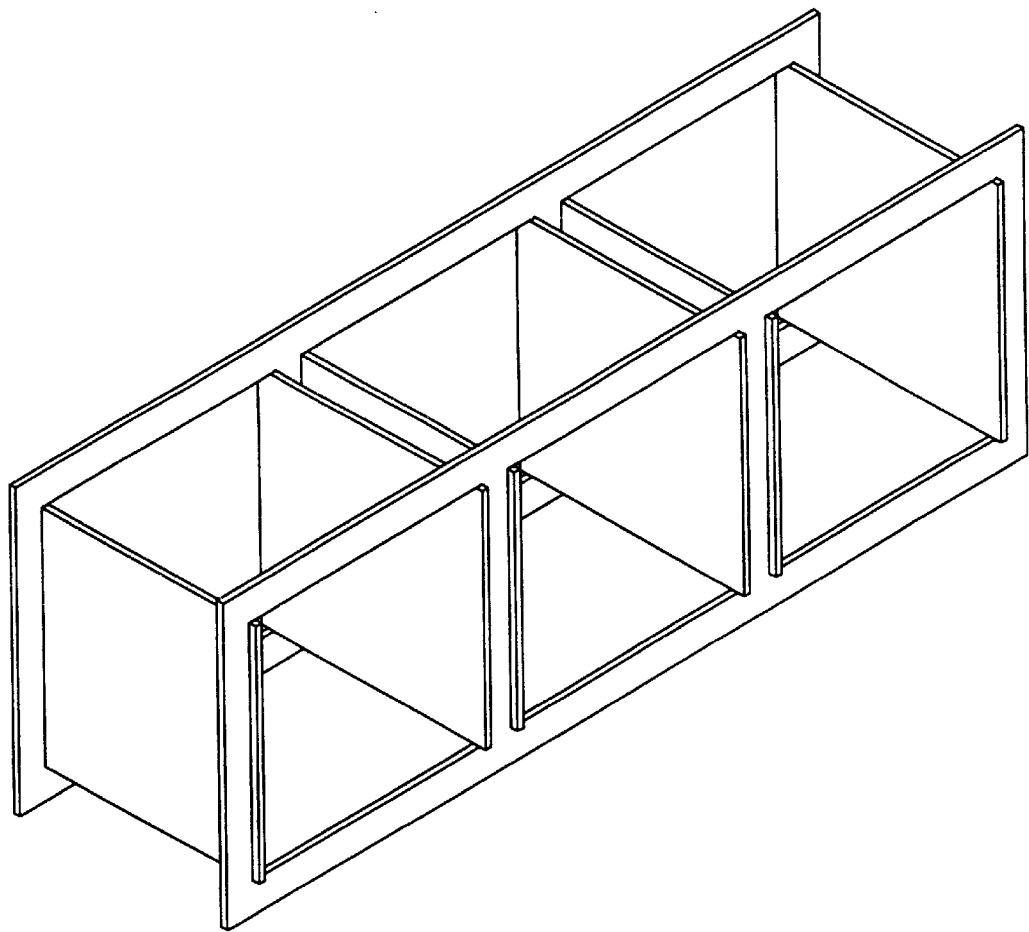

As can be seen, the chassis (FIG. 2a) are placed parallel to each other and horizontally. For each chassis 3 opening (FIG. 2b) two base plates 21 are inserted whose notches 7 are associated with the grooves 61 provided in their thicknesses. FIG. 2c illustrates the positioning of the notches 7 in the uprights 9. The grooves are situated on the edges of the rungs 10 of the chassis 3. In FIG. 2d the righting of one of the plates 21 is represented which wedges between the uprights 9 of the chassis 3 and whose grooves 61 grip the rungs 10 of the chassis 3. FIG. 2e is the illustration of the same operation for the other plate 21.

Figure 3A:
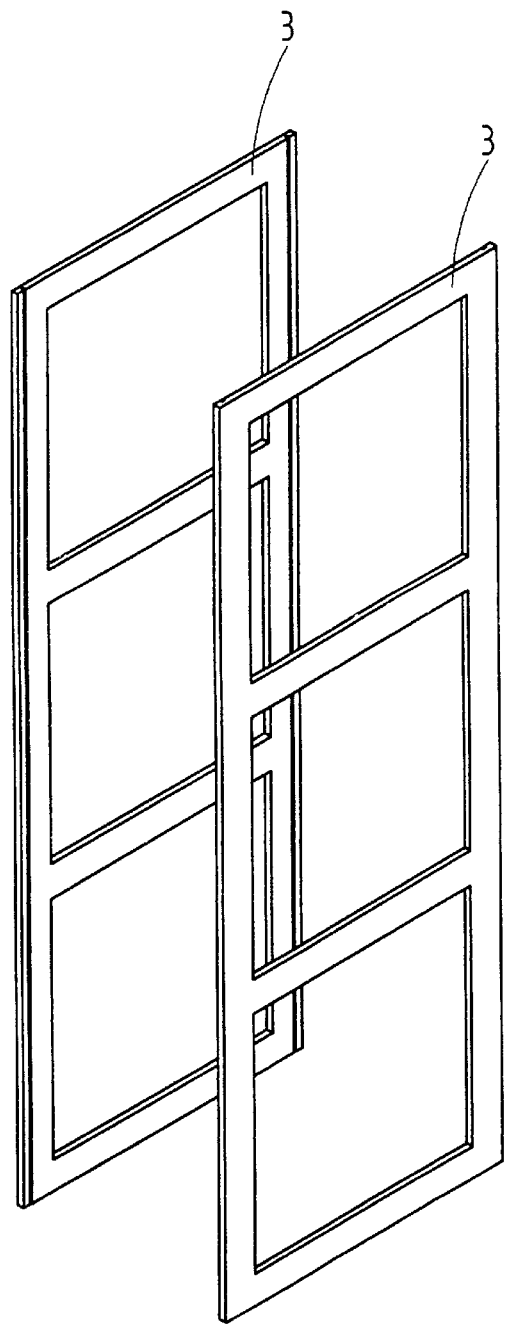
FIGS. 3a to 3r represent a bookcase (FIGS. 3a to 3h) and a chest (FIGS. 3i to 3r) by very explicitly detailing the various stages of assembly of these respective elements.

In FIG. 3a two chassis 3 are represented placed in parallel.

Figure 3B:
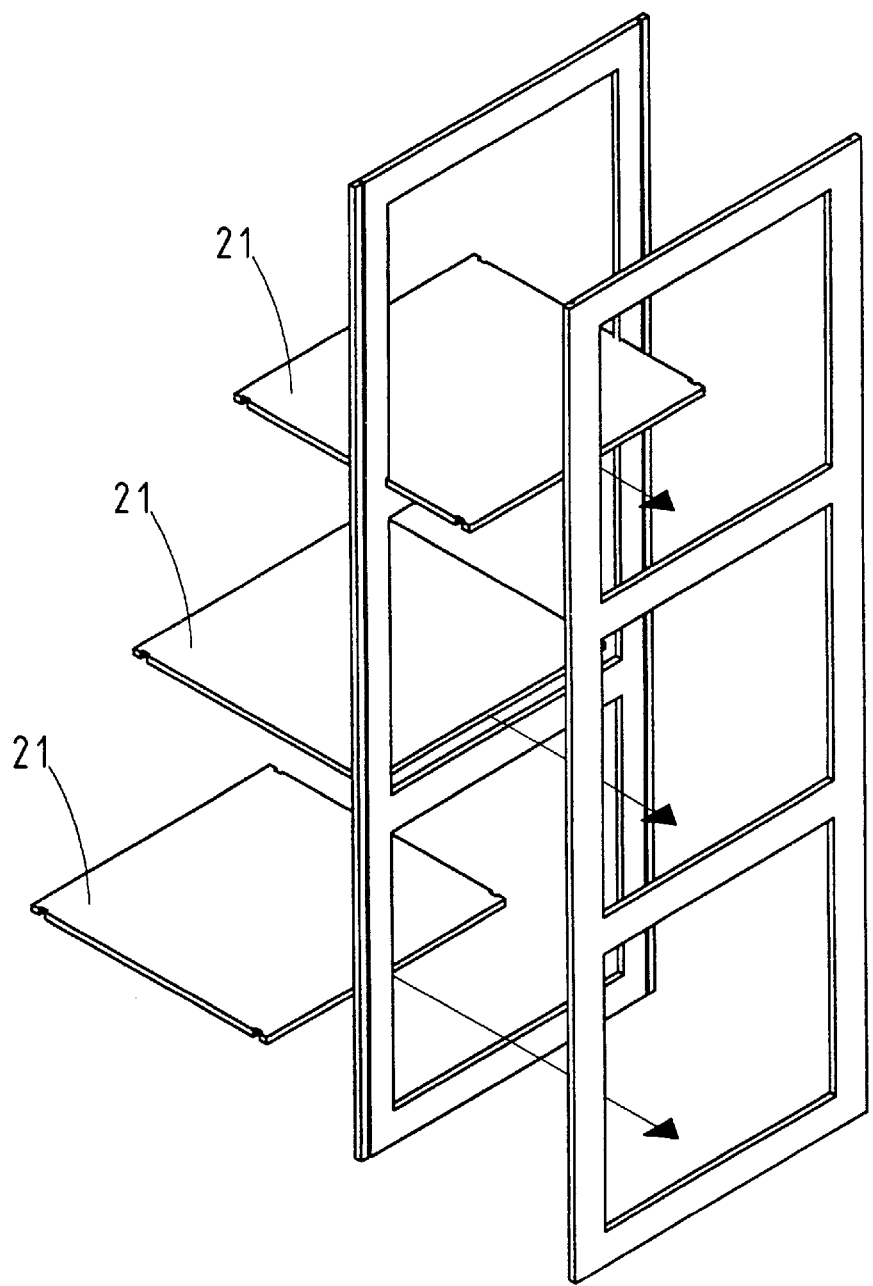
Figure 3C:
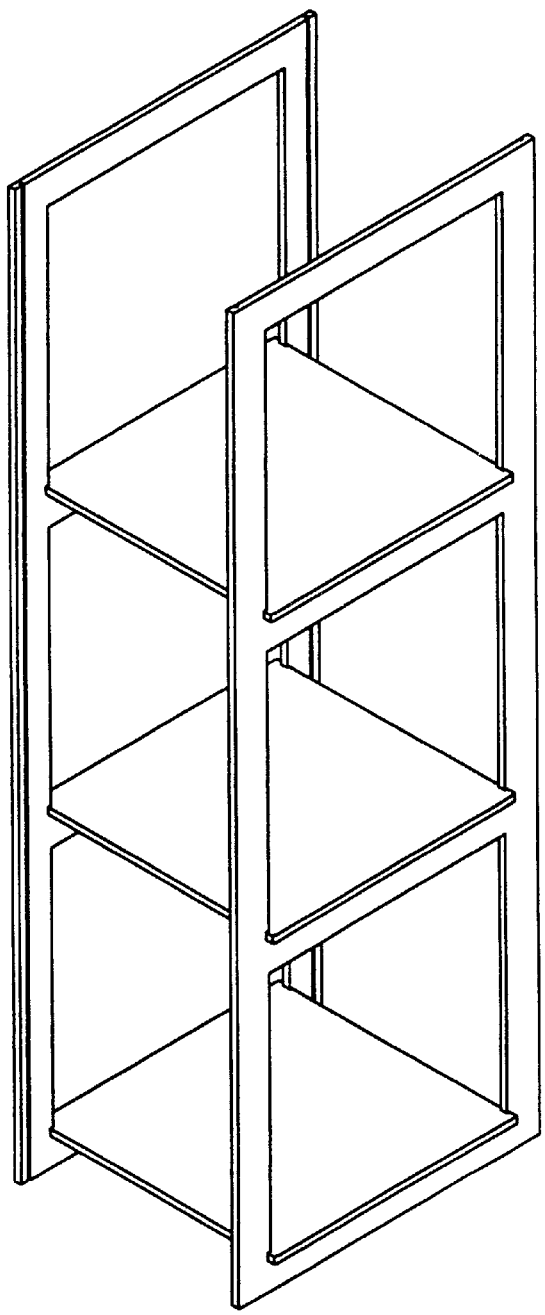
Figure 3D:
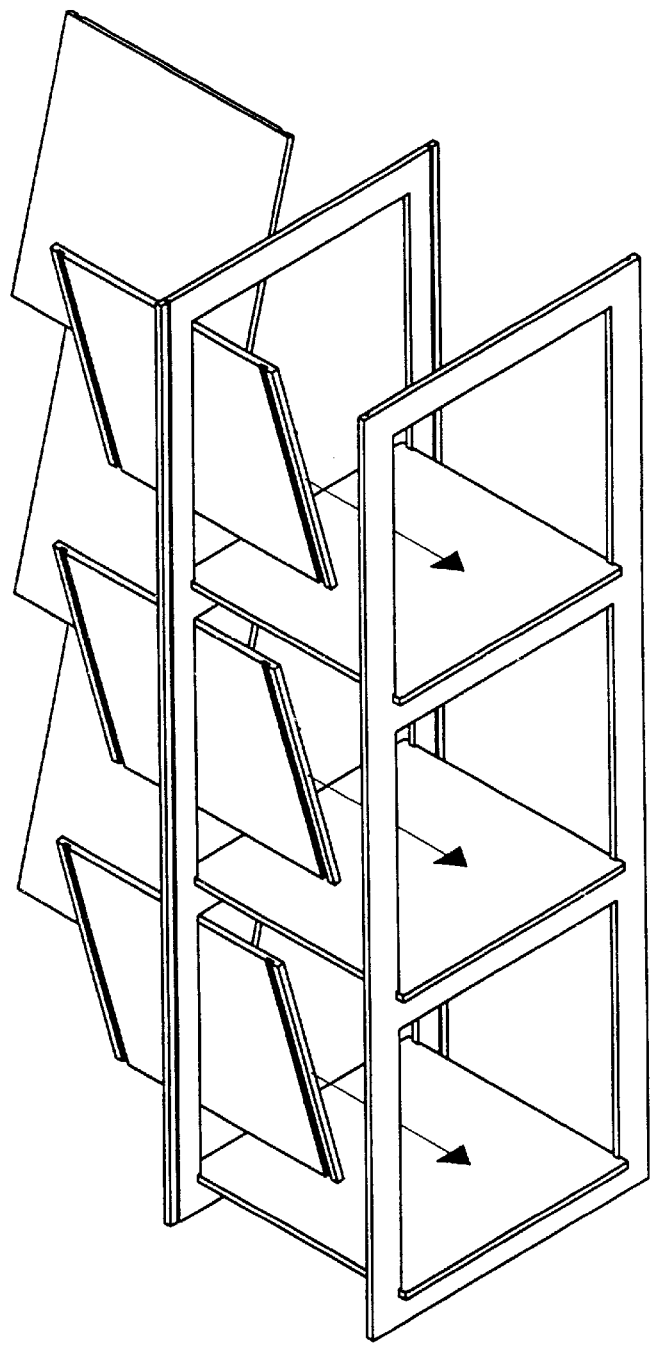
Figure 3E:
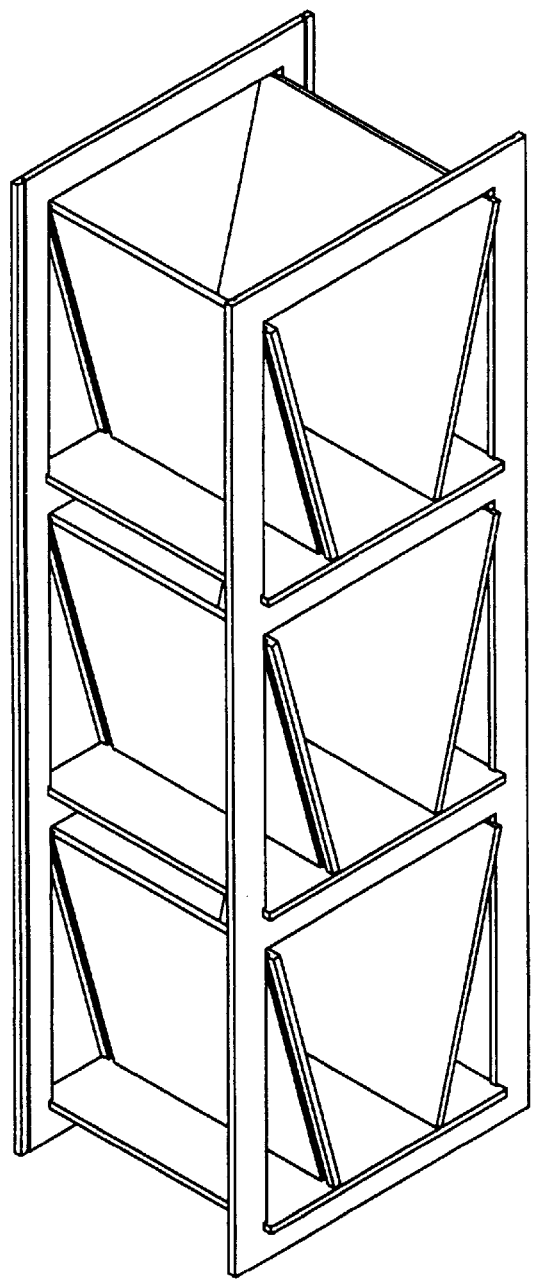
Figure 3F:
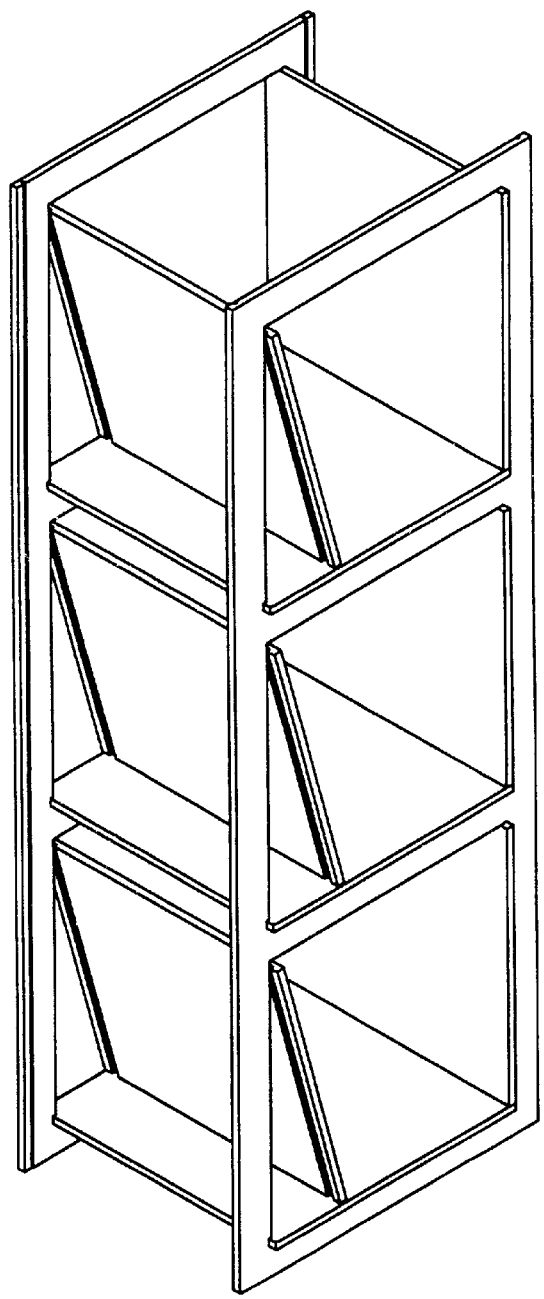
Figure 3G:
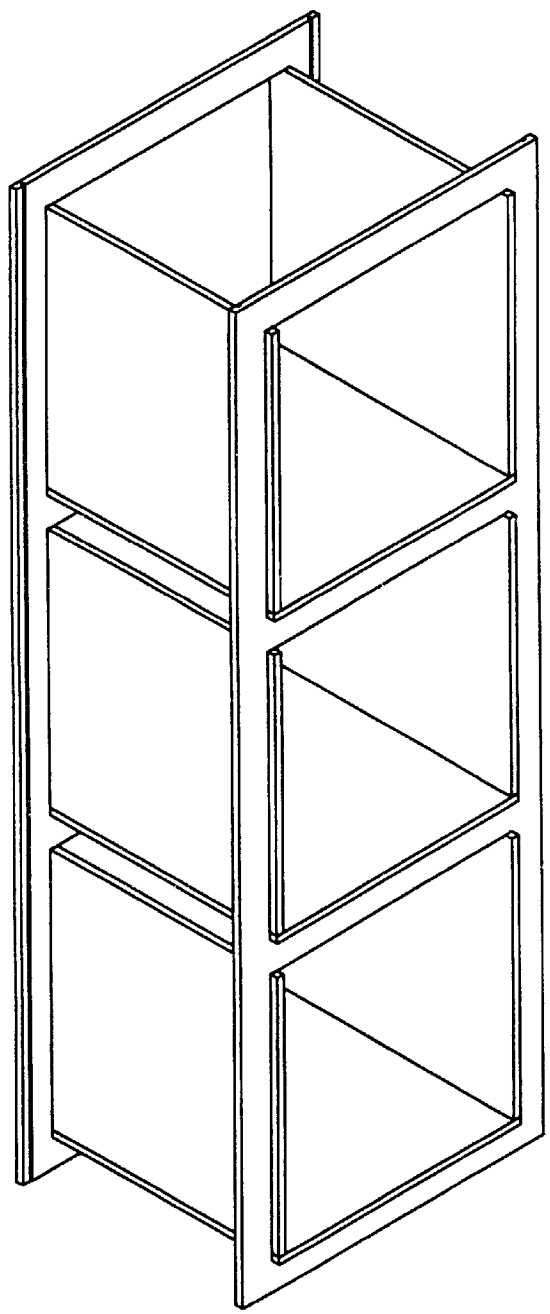
Figure 3H:
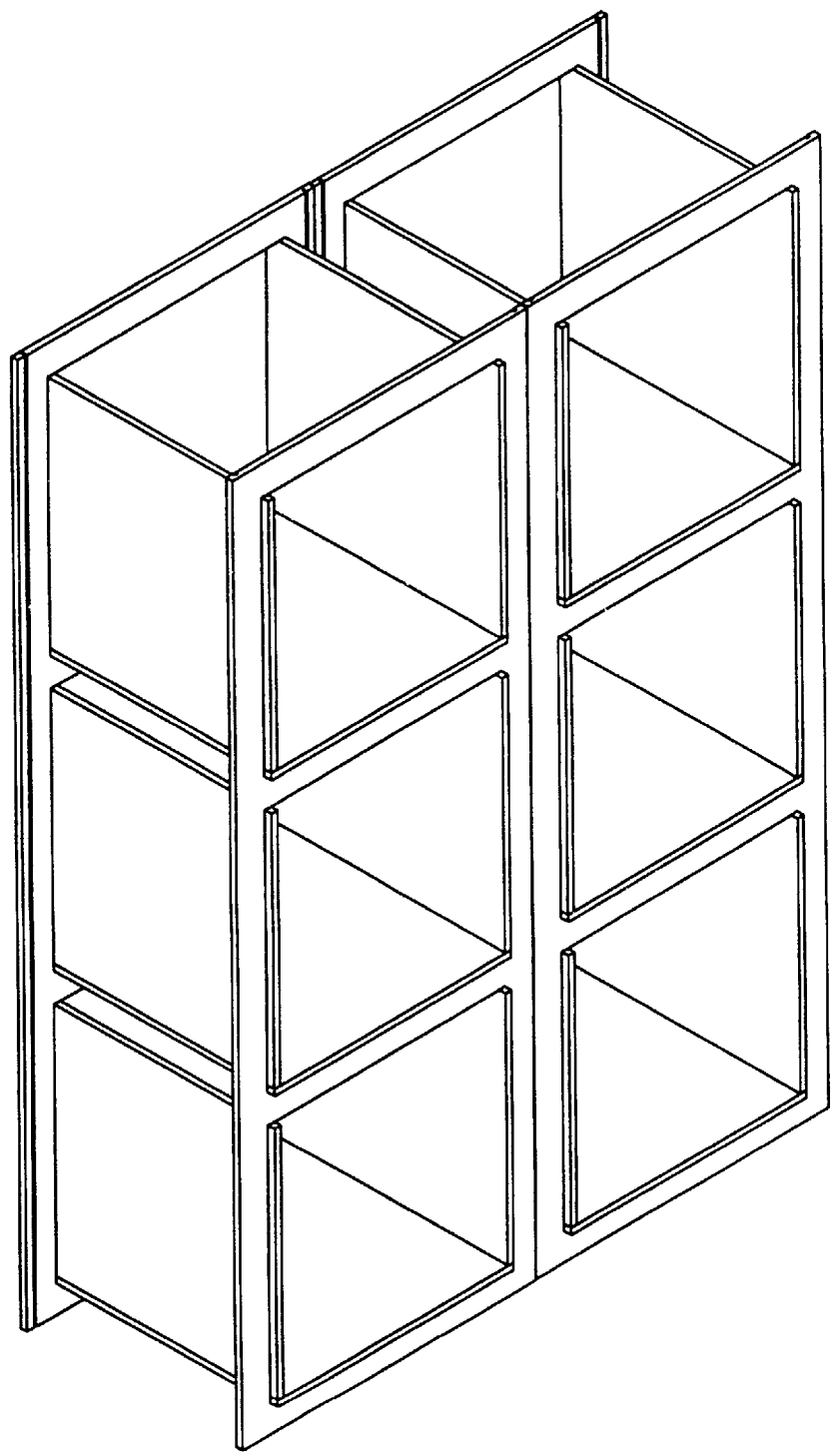
Figure 3I:
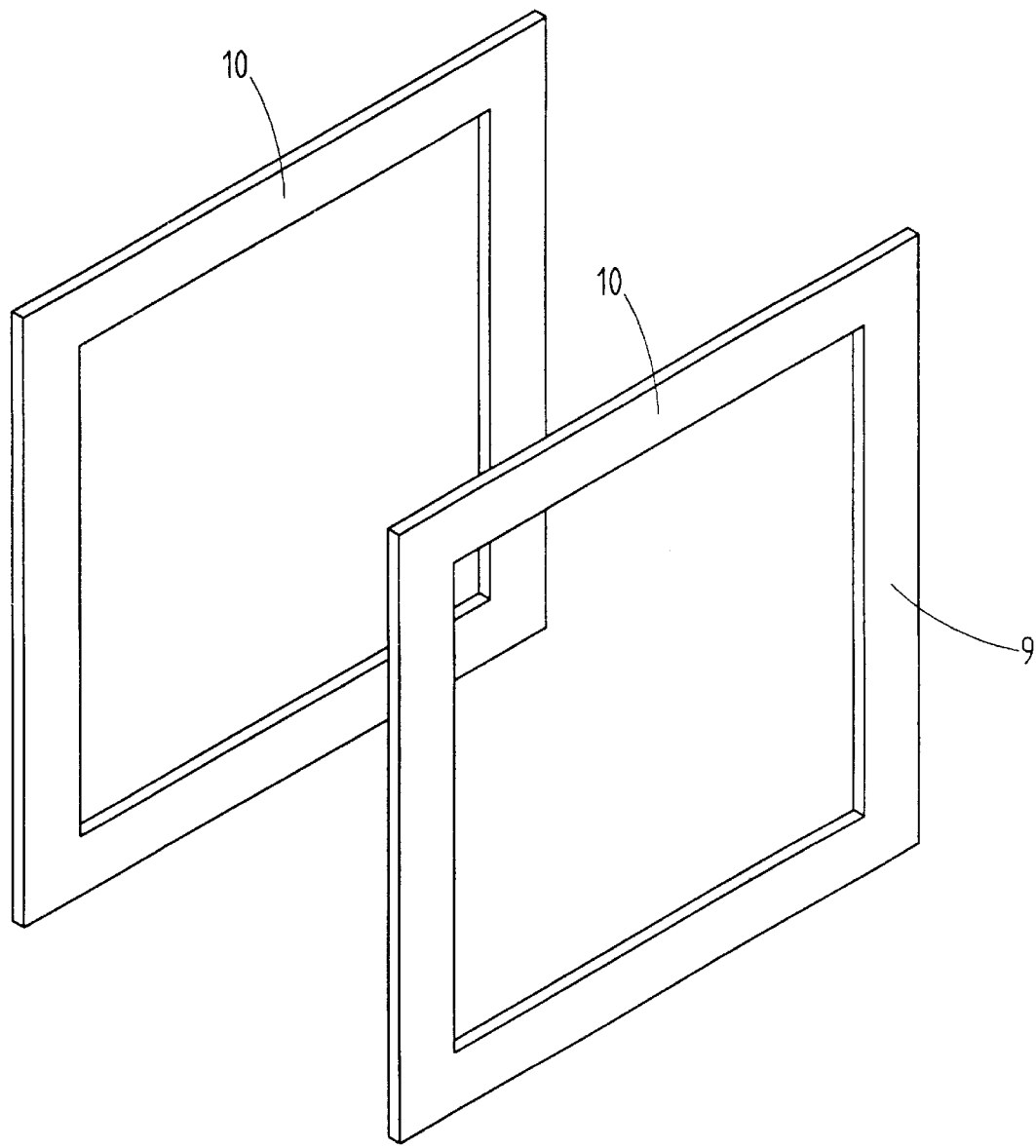
Figure 3J:
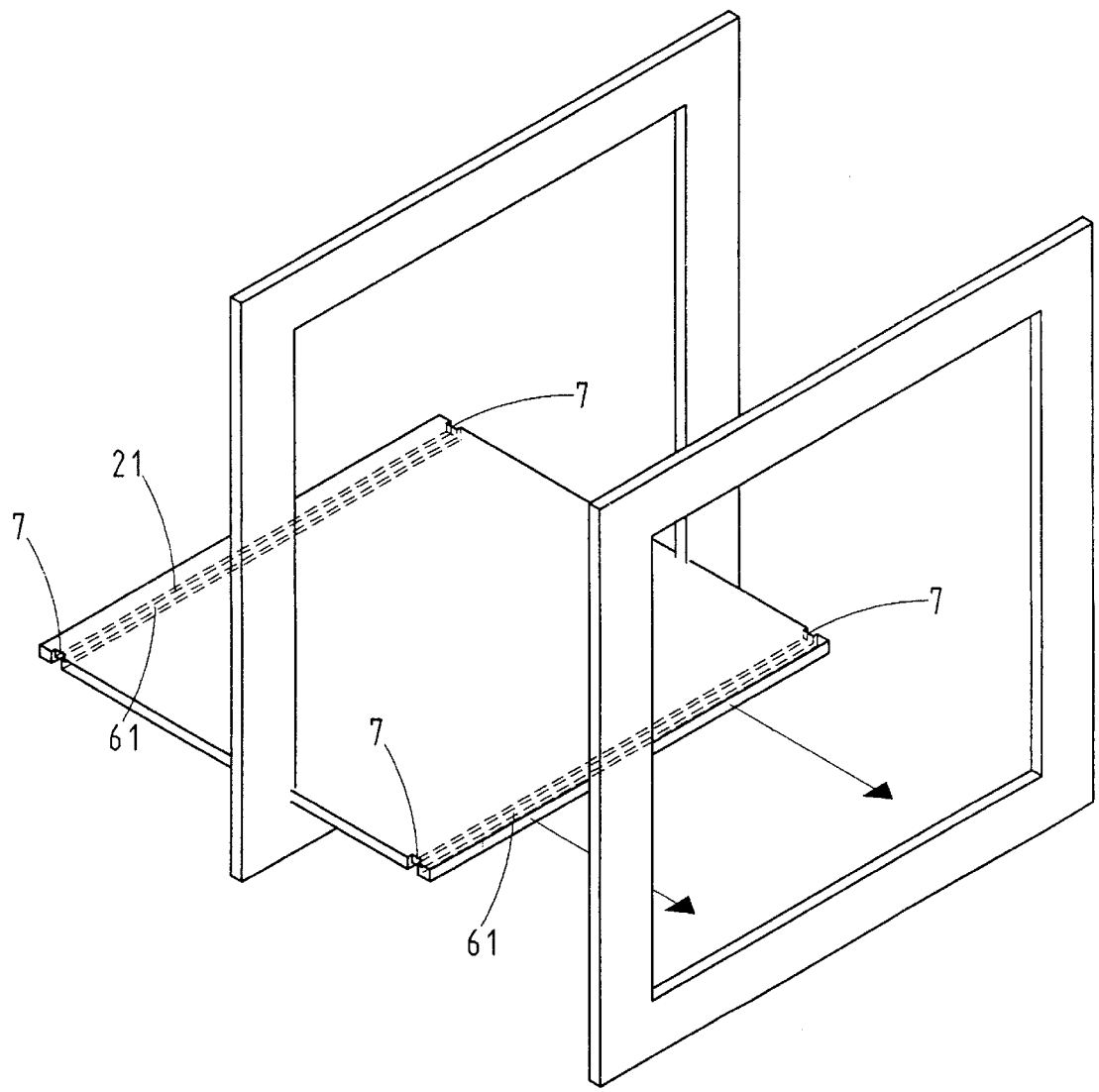
Figure 3K:
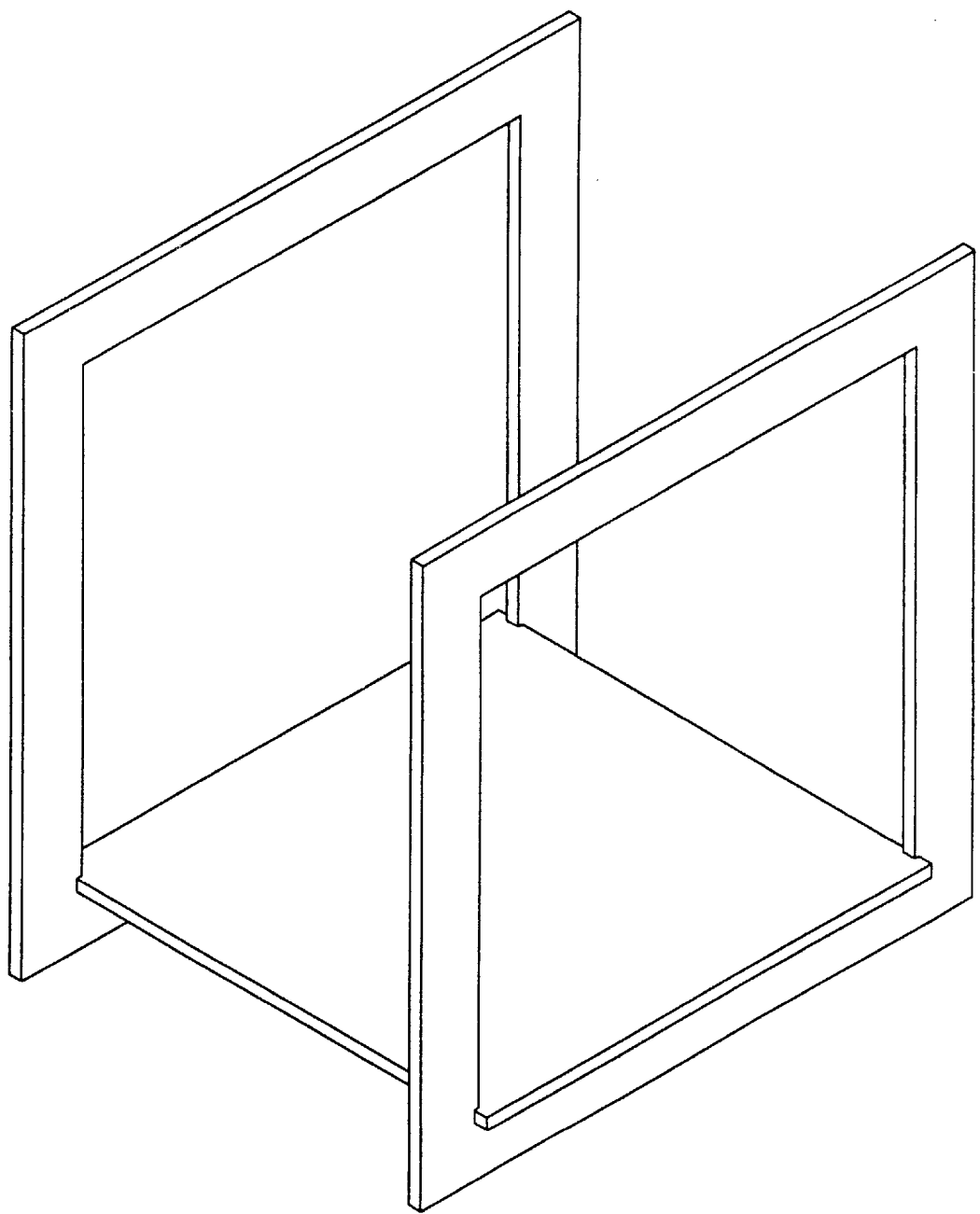
Figure 3L:
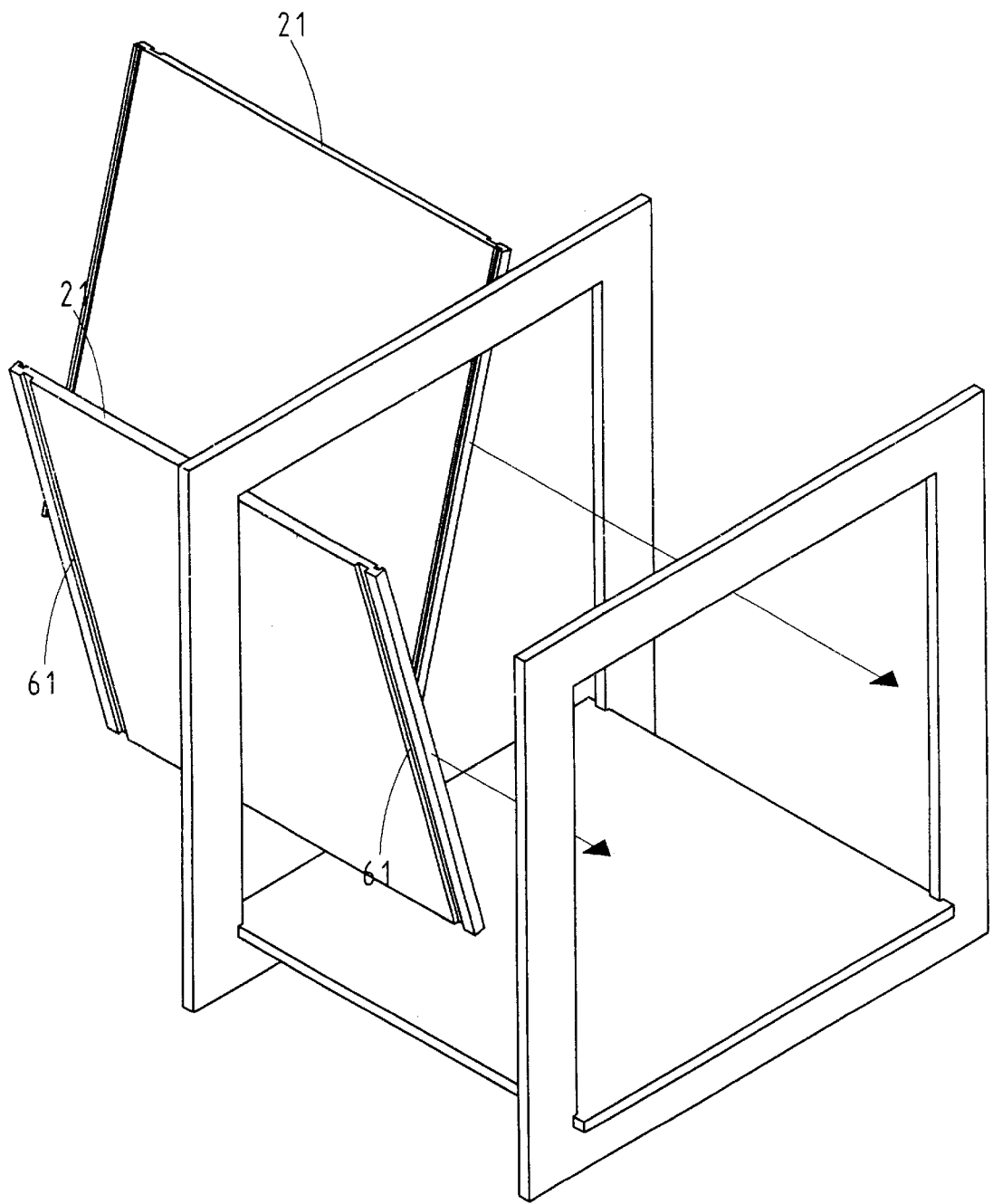
Figure 3M:
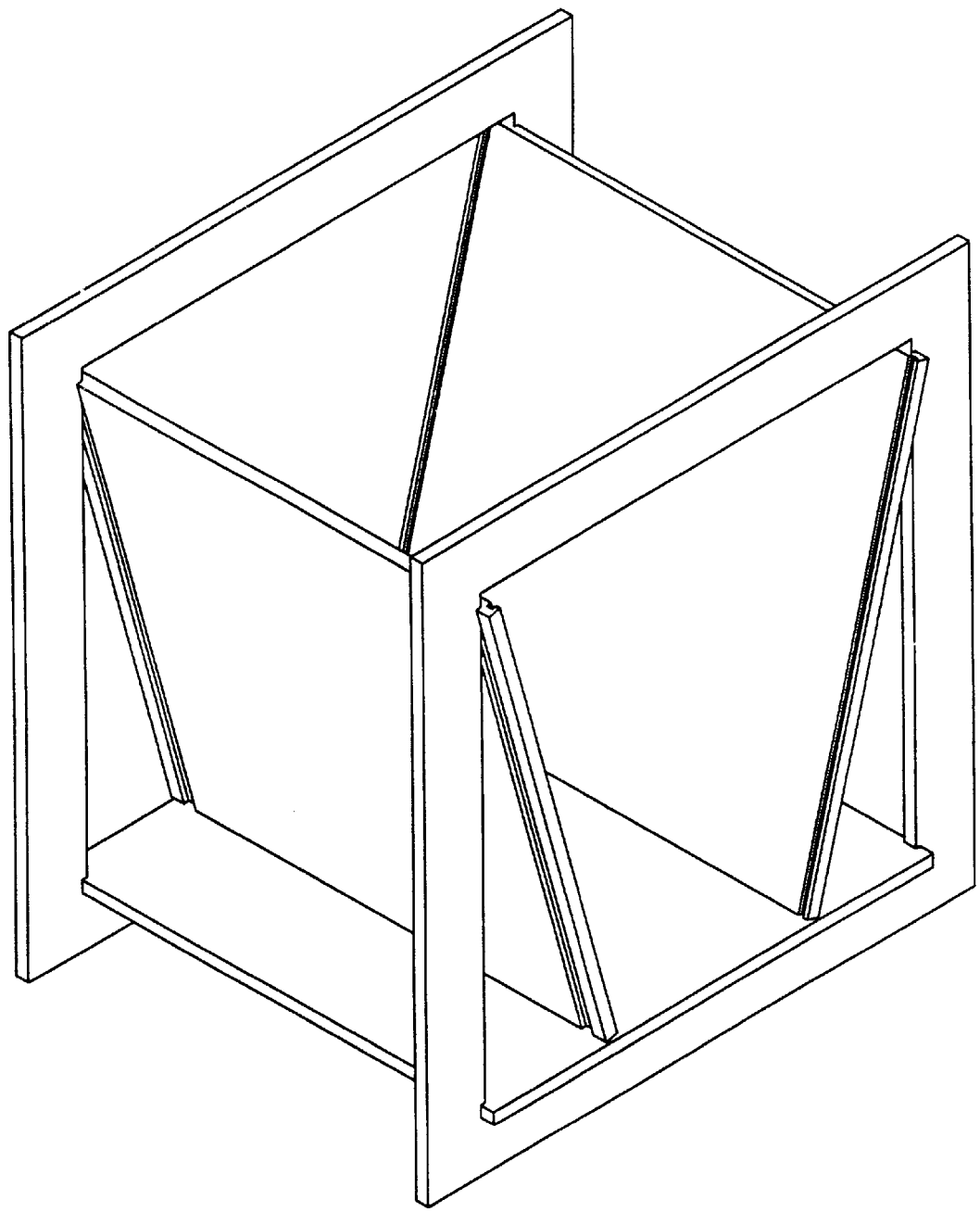
Figure 3N:
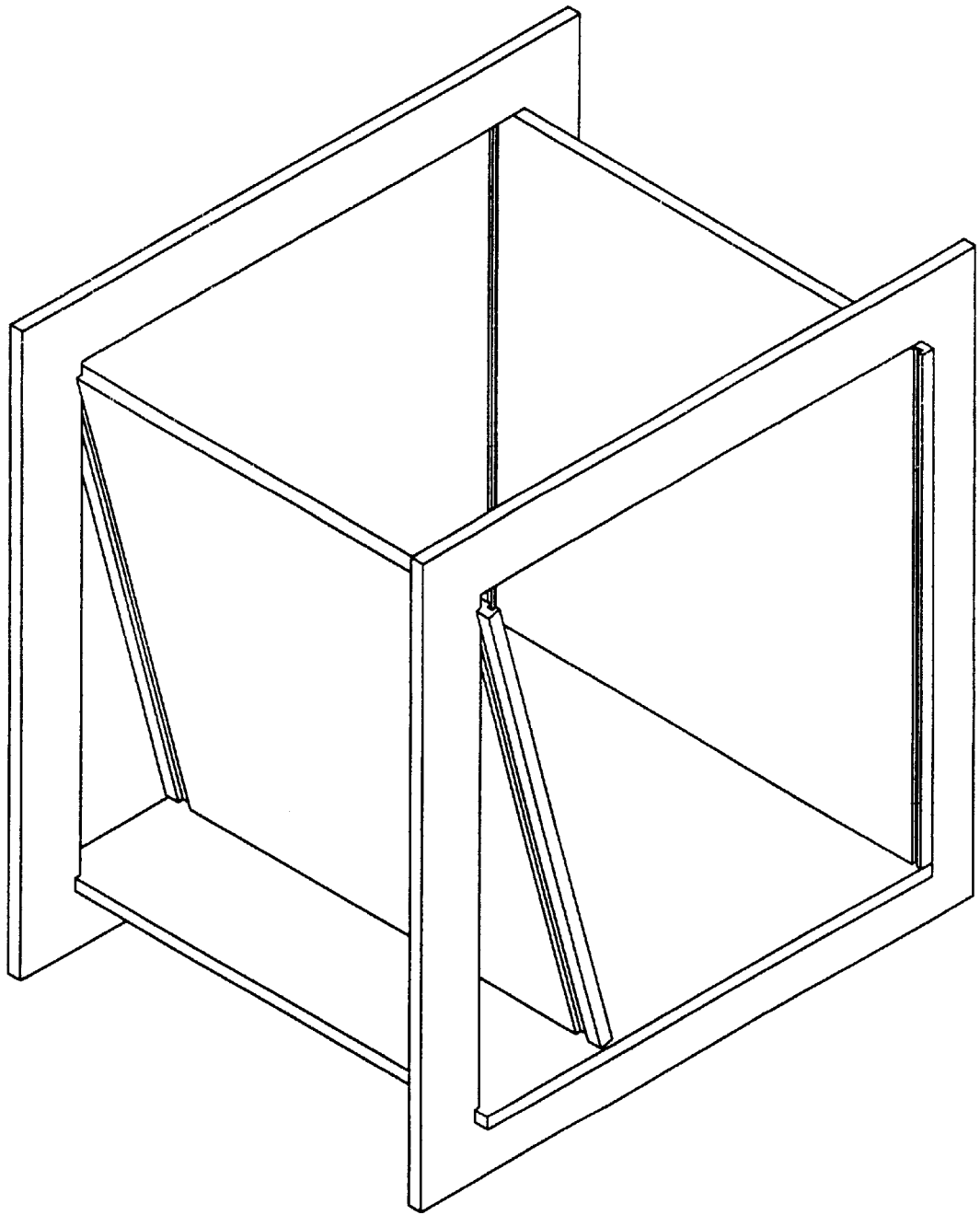
Figure 30:
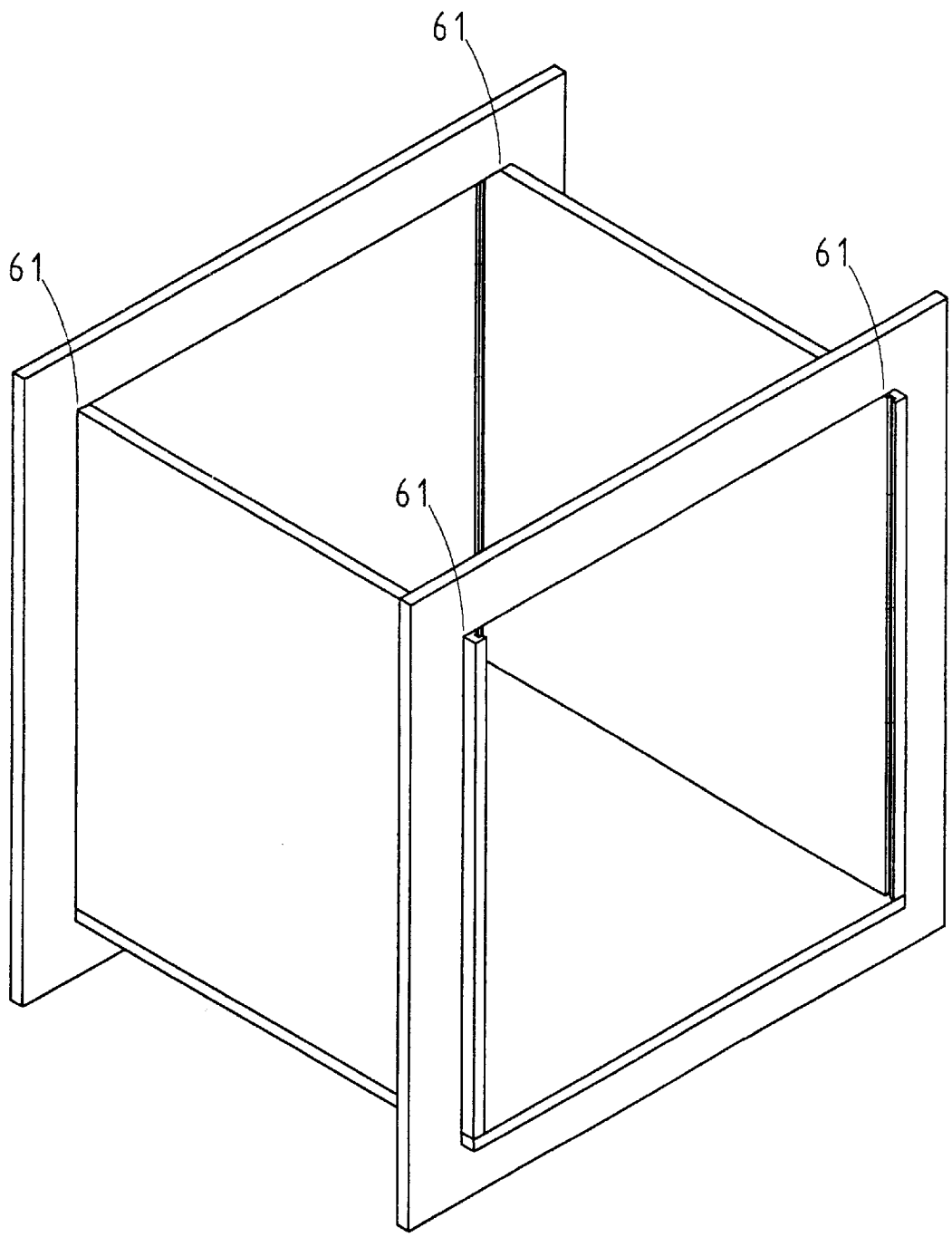

In FIG. 3b, bases 21 provided with grooves 61 and notches 7 are inserted. The exact positioning of the plates 21 is resumed in FIG. 3c whereas FIG. 3d shows the insertion of two plates 21 placed laterally, per space, between the rungs 10. Then, in FIG. 3e, the upper notches 7 grip the rungs 10 of the structure, the lower notches resting on the base plate 21. The grooves 61 are, consequently, facing the upright 9. In FIG. 2f, one of the lateral panels 21 is righted in such manner as to be tangent to the upright 9 of the chassis 3, the grooves serving as seating for the uprights 9 of the chassis 3. FIG. 3g illustrates the same operation for the other lateral panel 21, which finishes the erection of the structure. FIG. 3h represents two identical structures constructed according to what has just been described.

FIGS. 3i to 3o are the illustration of a sequence of operations exactly identical to that from FIGS. 3a to 3h but it relates to the manufacturing of a chest.

Figure 3P:
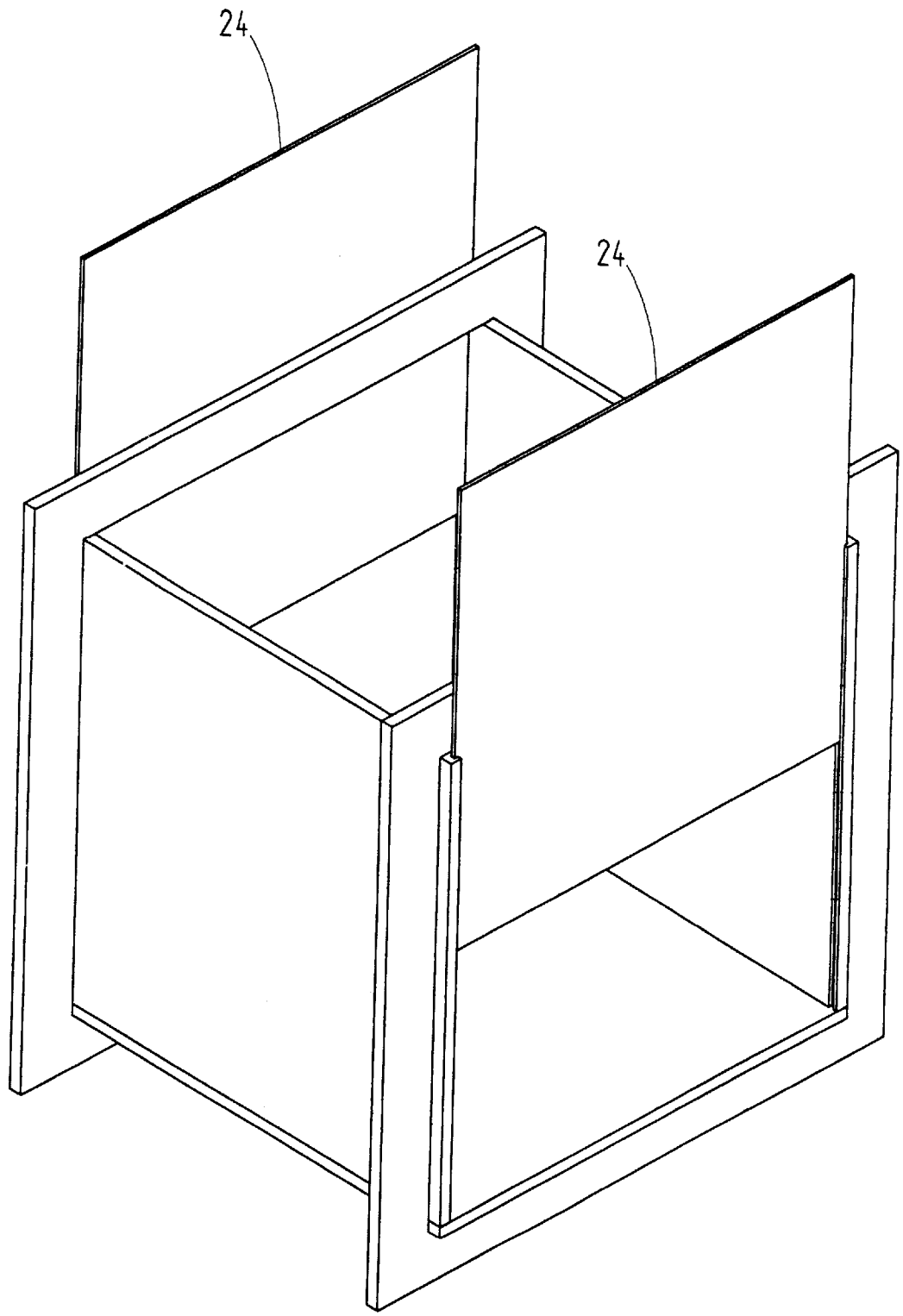
Figure 3Q:
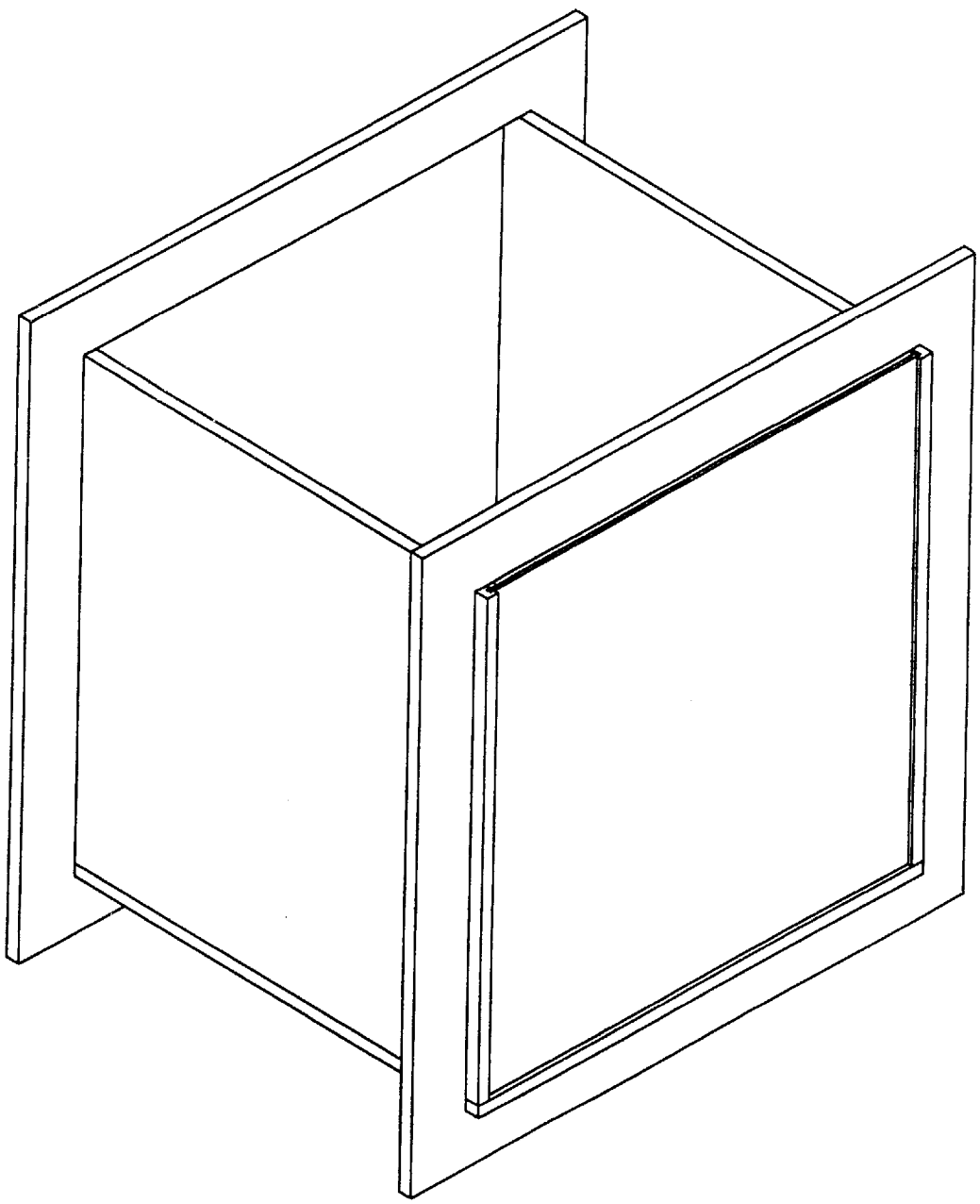
Figure 3R:
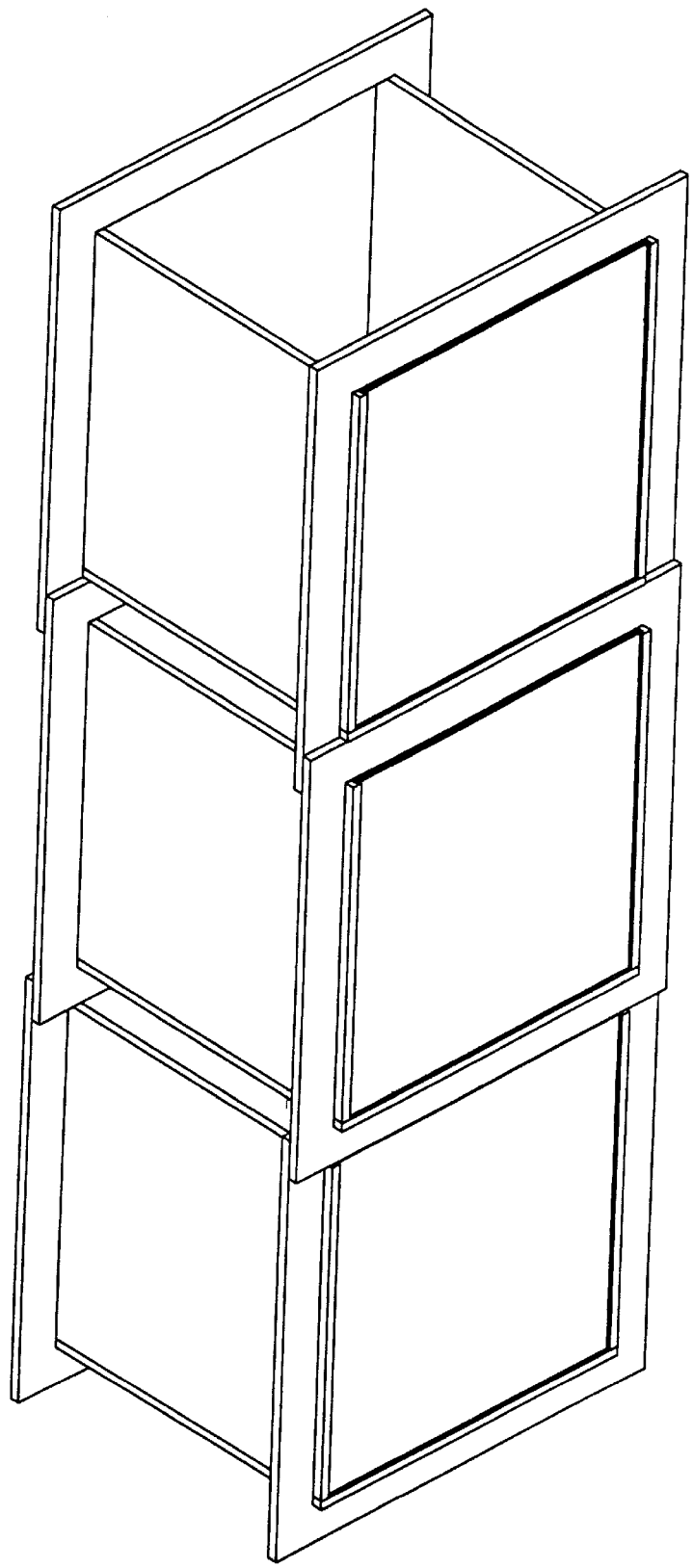
Figure 4A:
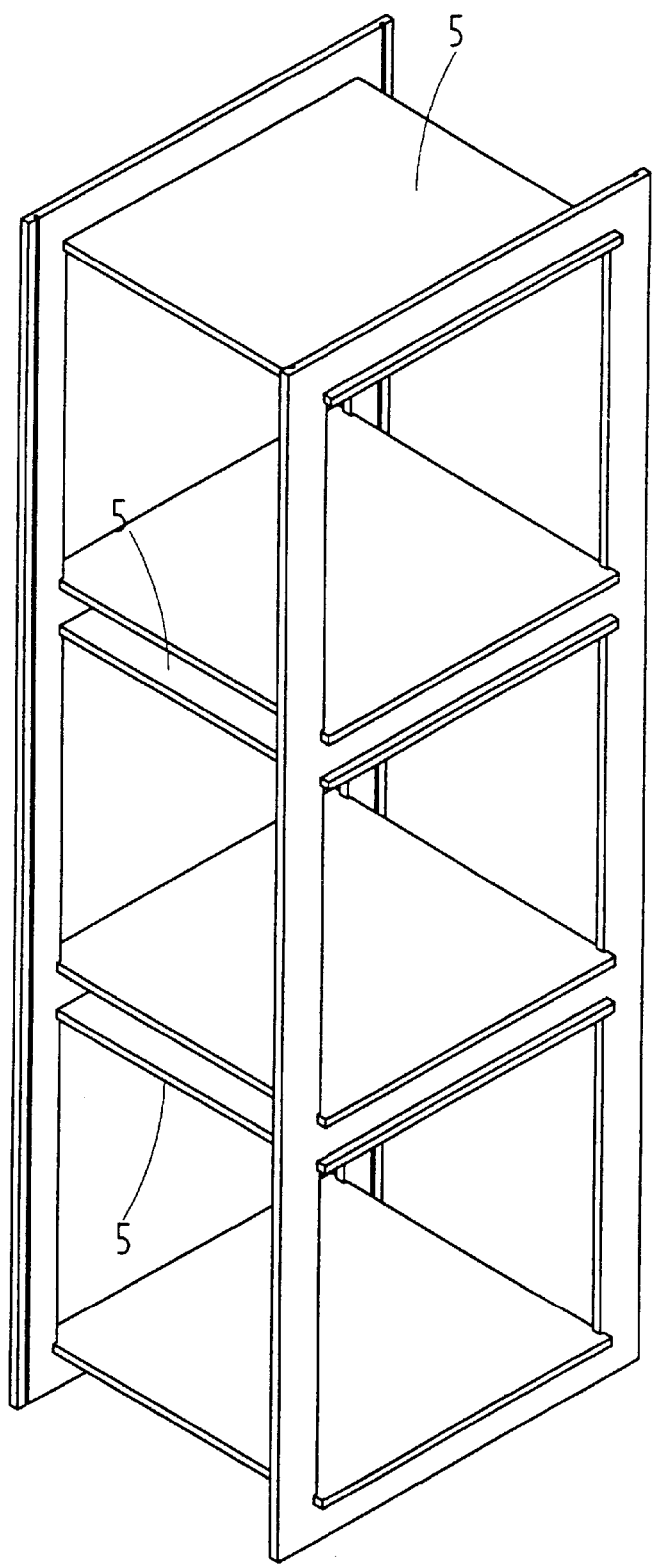
Figure 4B:
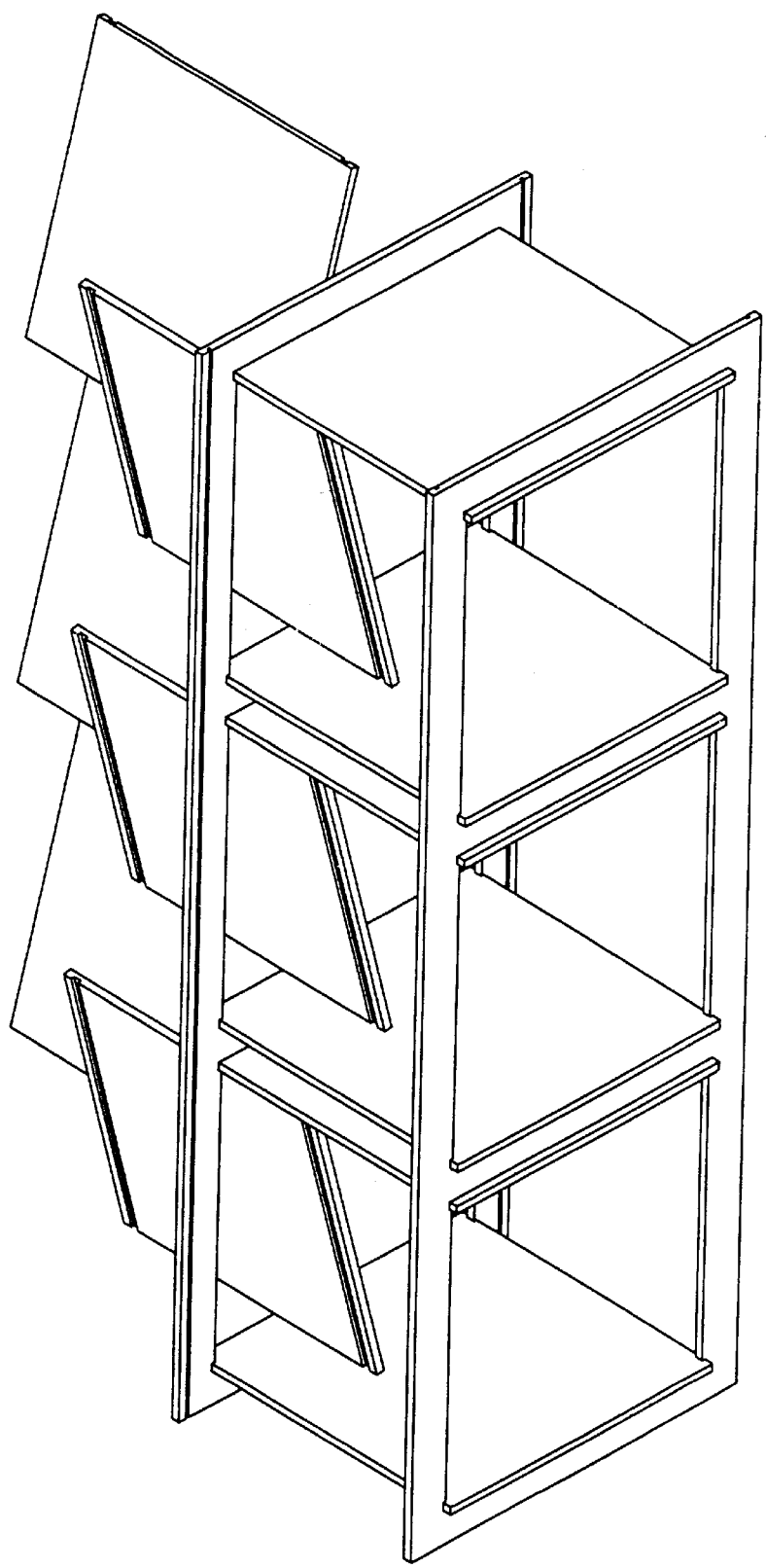
Figure 4C:
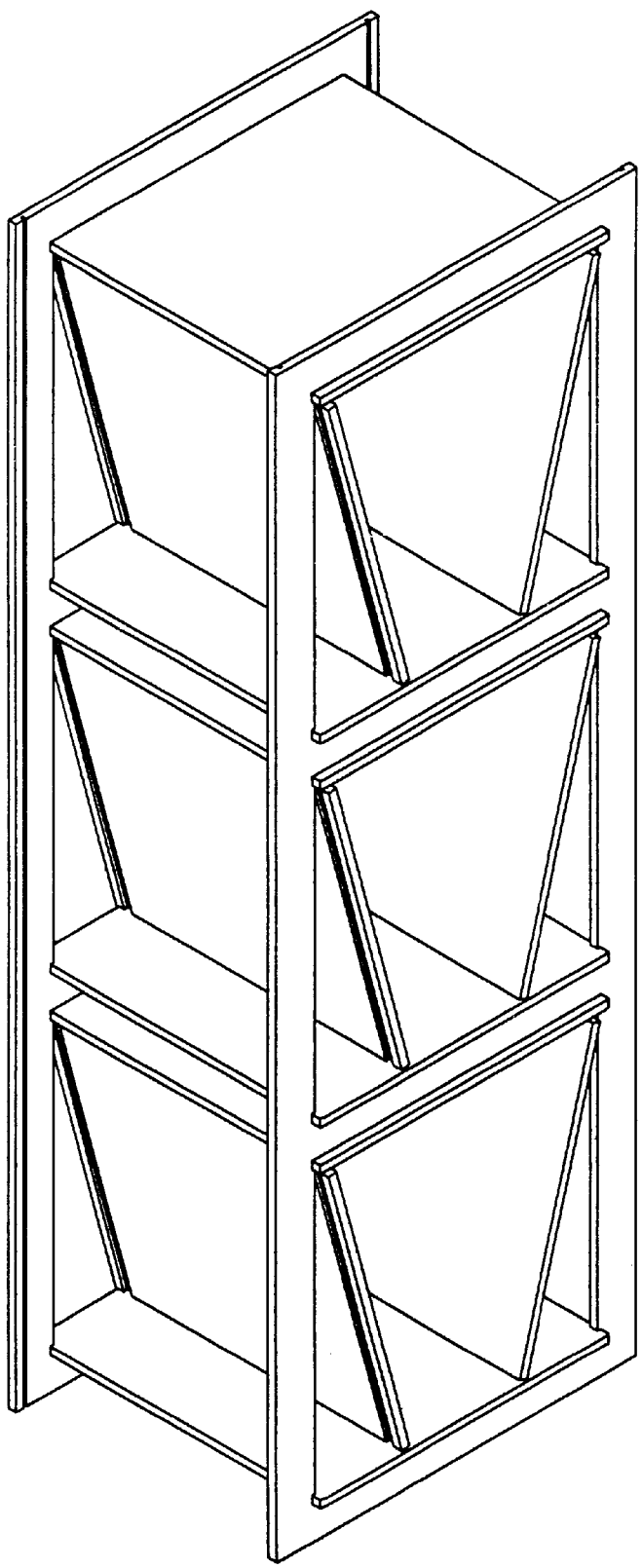
Figure 4D:
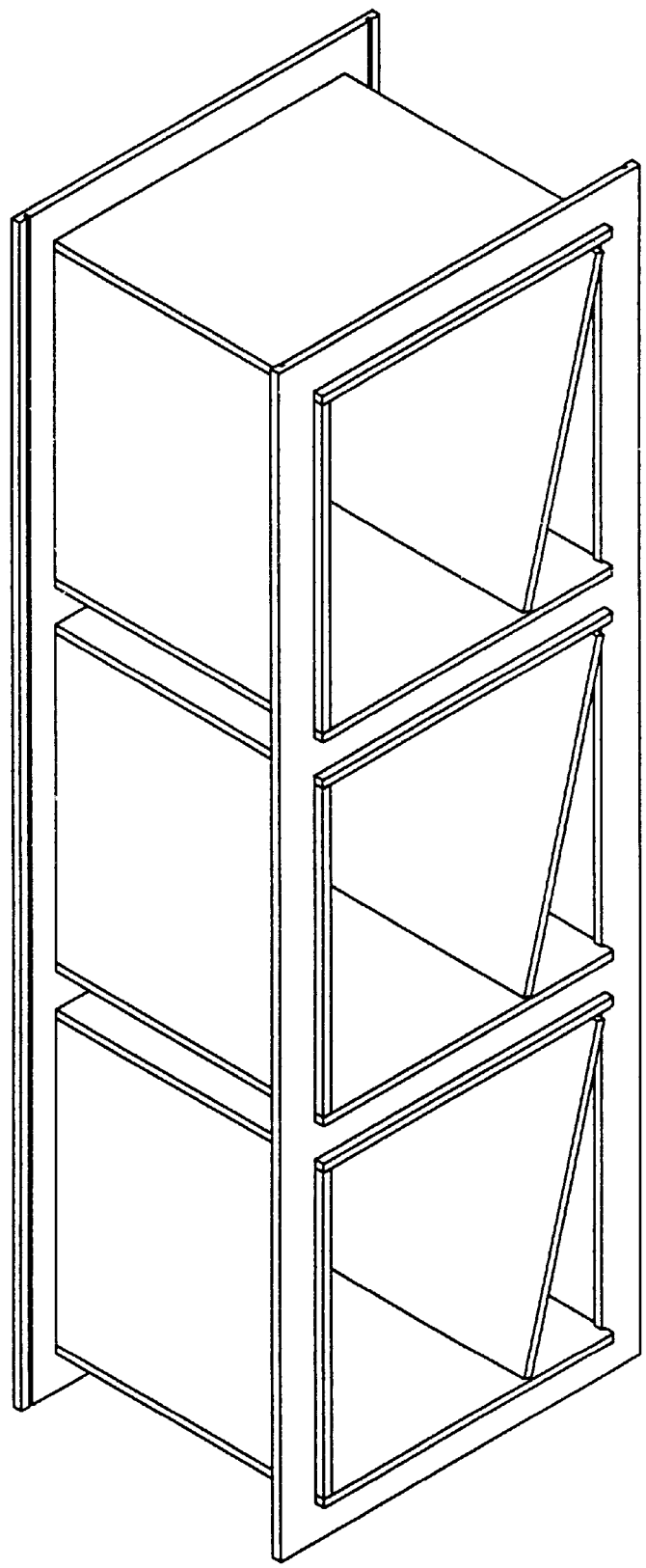
Figure 4E:
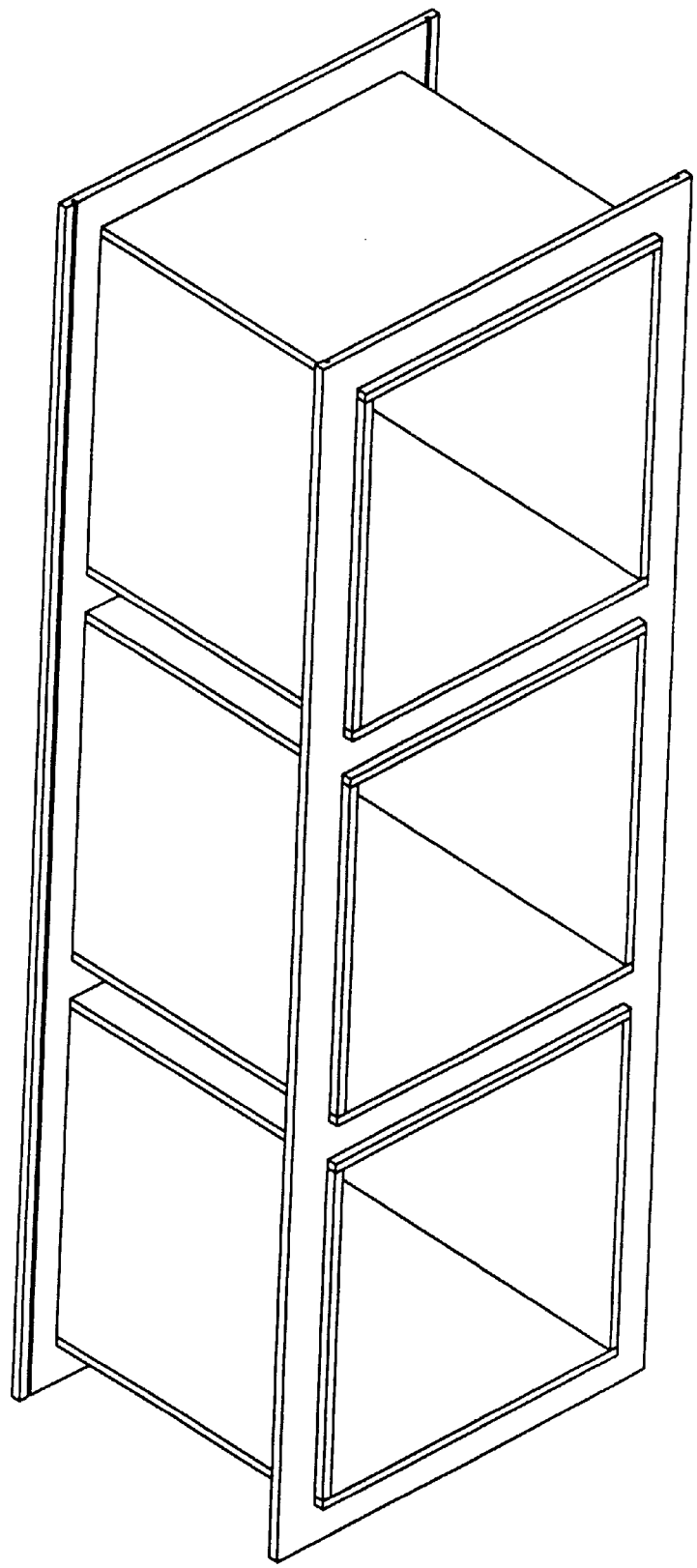
Figure 4F:
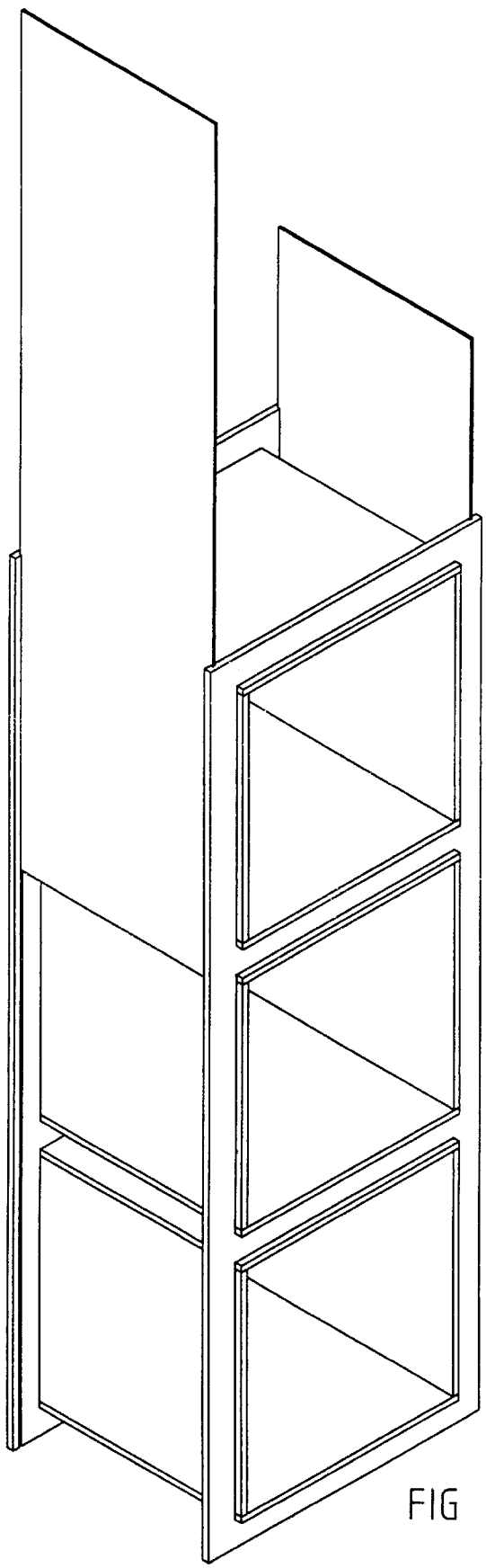
Figure 4G:
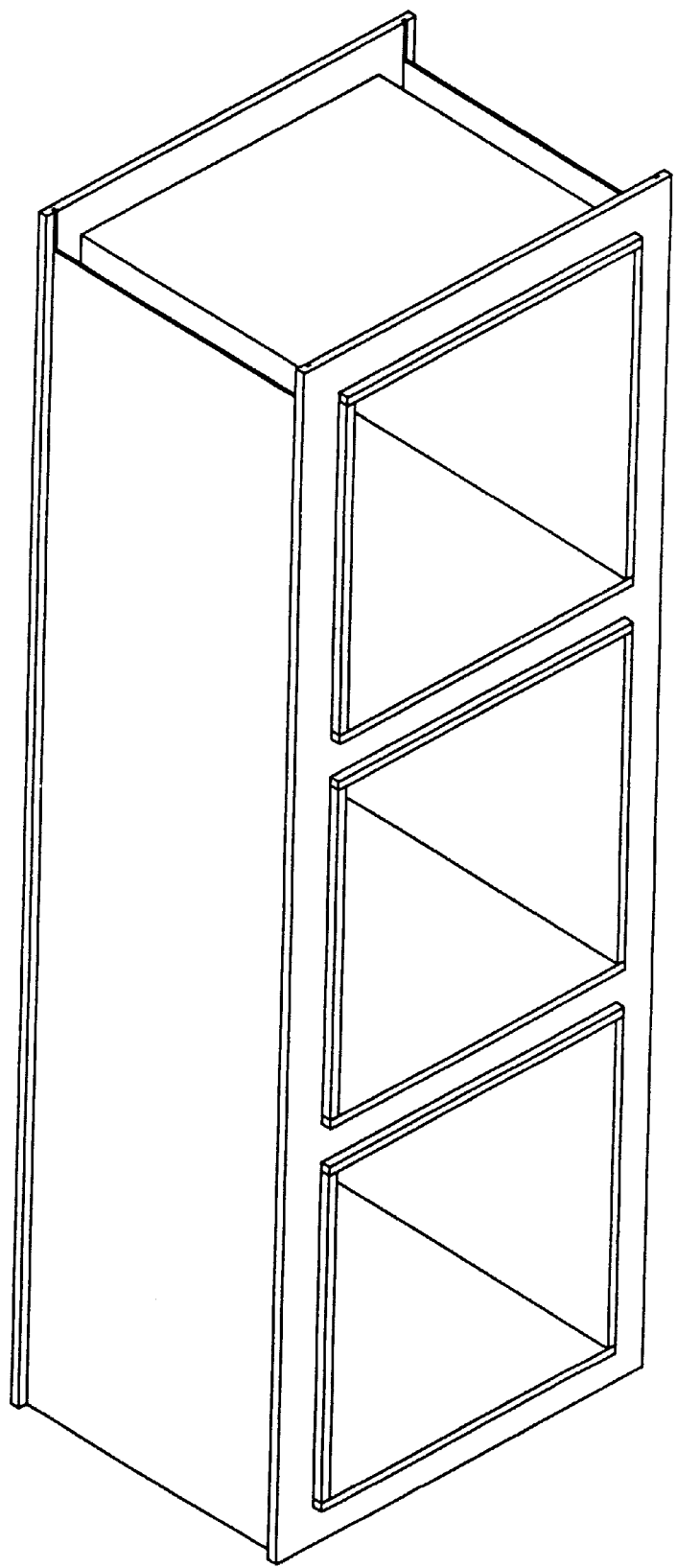
Figure 4H:
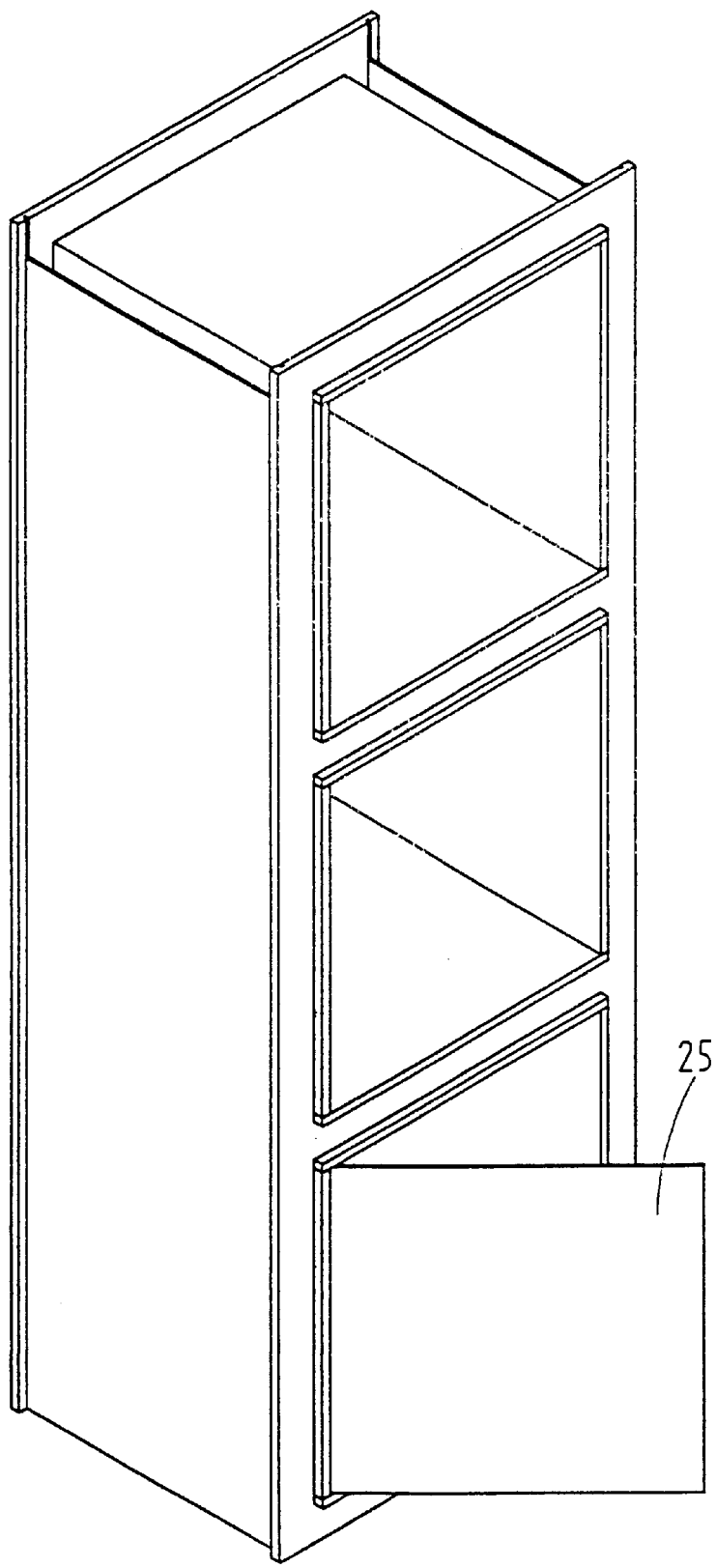
Figure 41:
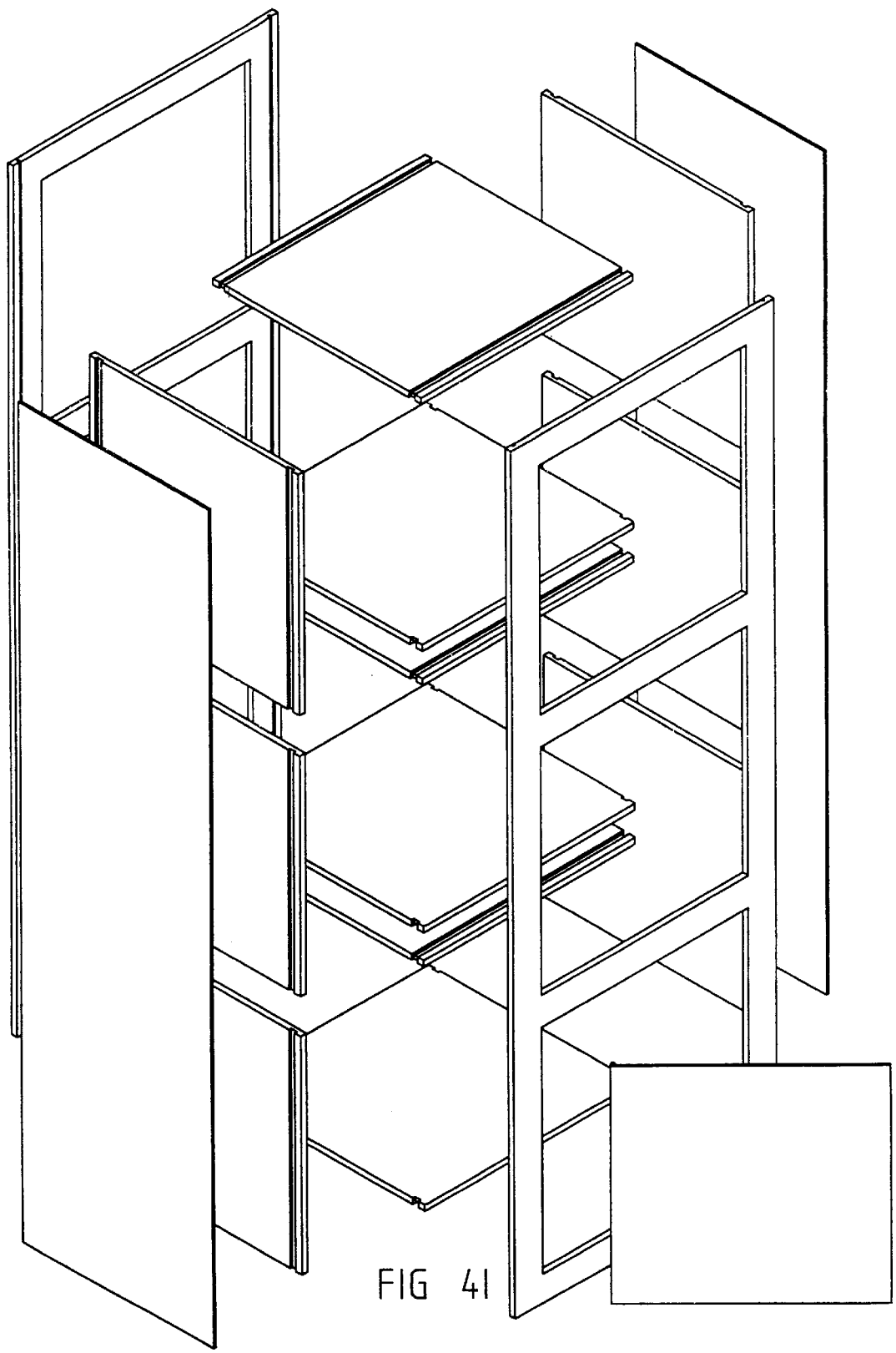

For this case, the lateral panels 21 are provided with two guiding grooves each in such manner that the lateral panel of the chest 24 is inserted by sliding along the guiding grooves in order to close the chest. (See FIG. 3p for the sliding and FIG. 3q for the finished chest.) FIG. 3r is the illustration of three stacked-up chests.

FIGS. 4a to 4i illustrate both a storage unit with a door and two finishing sides and a casing for concrete. In relation to the structures described above, a storage unit and/or a casing for concrete are differentiated by the presence of a door 25 (FIG. 4h and FIG. 4i which is an exploded view), of a top cover and impermeable sides (case of the casing for concrete) or finishing sides (case of the storage unit). For the storage unit, the lower surface of the top cover and the upper surface of the base can each be bored with an indispensable hole for the correct mounting of a pivoted door. Apart from this characteristic specific to the storage unit, the assembly principle is identical to that of the three types of structures given by way of nonrestrictive example based on FIGS. 1a–1e, 2a–2e, 3a–3r the exceptions being that the lateral panels wedge between a base 21 and a top cover 5 and that two sides 23 are added which, in the case of a casing resting on the ground, and fillable from above with concrete or a moldable material, enables the three-dimensional form of the structure to be constructed less the thickness of the chassis 3, the thickness of the cut-out panels 21, 2, 23 and 5 and of the part of the projecting strips protruding past the uprights 9 and the rungs 10 of the chassis 3. The possible recovery of the mold is of course a very great advantage.

Clearly, this invention is not restricted to the embodiments described and represented but it is capable of numerous variants available to experts without departing from the scope of this invention.

What is claimed is:

1. A rigid tridimensional structure made of flat parallel chassis comprising openings with edges forming rungs connecting two uprights, and comprising at least two base panels provided with notches or grooves, located perpendicularly to the plane of the chassis, and fixedly interconnecting said chassis by wedging, the notches or grooves of the panels gripping the edges of said empty spaces.

2. A structure according to claim 1, characterized in that there are two panels for each space between the rungs of the chassis and two or more chassis.

3. A structure according to claim 1, characterized in that there are three panels for each space between the rungs of the chassis and two or more chassis.

4. A structure according to claim 1, characterized in that there are four panels for each space between the rungs of the chassis and two or more chassis.

5. A rigid tridimensional structure made of flat parallel chassis comprising openings with edges forming rungs and uprights, and comprising, within a same opening, at least one lateral panel tangent to the uprights of the chassis and a base panel, located perpendicularly to the plane of the chassis, either or both panels being provided with notches or grooves, and said panels fixedly interconnecting the chassis by wedging action, the notches or grooves of the panels gripping the edges of the openings.

6. The structure according to claim 5, wherein the chassis or the panels are molded.

7. The structure according to claim 5, wherein the panels are cut-out panels.

8. Use of the structure according to claim 5, for the construct of a partition, or an openwork wall, a beam, a bookcase or a storage unit.

9. Use of the structure according to claim 5, for the construct of a strippable casing.

10. A rigid tridimensional structure made of at least two flat parallel chassis provided with edges and empty spaces forming rungs and uprights, and of lateral and base panels located perpendicularly to the plane of the chassis, wherein the lateral panels are tangent to two corresponding uprights of said at least two chassis and provided with upper notches gripping the edges of the corresponding rungs of the chassis, and said lateral panels rest on said base panels perpendicular to the uprights of the chassis, said base panels being provided with notches gripping the edge of the uprights.

11. A method of assembly for a rigid tridimensional structure made of at least two flat parallel chassis, each of the chassis comprising at least one rectangular empty space with edges forming rungs and uprights, and comprising panels located perpendicularly to the plane of the chassis, said panels being provided with notches and/or grooves, wherein the assembly between the at least one chassis and the panels comprises the step of inserting with inclination and wedging with force of said panels in the empty spaces, until perpendicularity of the edges of the panels to the uprights or to the rungs is achieved, said wedging resulting from the forced gripping of the edges of said empty spaces by said notches or grooves.

12. The method according to claim 11, comprising the prior step of cutting out the panels from a larger panel forming, after the cut-out operation, the chassis whereby waste material comes only from the providing of notches and/or grooves.

13. The method according to claim 11, wherein at least one of the panels is a rectangular panel the length thereof being equal to the height thereof plus twice the depth of the notches provided on said panel.

14. The method according to claim 11, wherein the panels comprise base and lateral panels, the height of the lateral panels being slightly greater than the distance separating two rungs.

15. The method according to claim 11, wherein the panels comprise base and lateral panels, the base panel having a thickness, the height of the lateral panels being slightly greater than a distance defined as the actual distance separating the thickness of the base panel, once assembled, and the upper rung of the corresponding empty space.

16. The method according to claim 11, wherein the panels comprise base, cover and lateral panels, the height of the lateral panels being slightly greater than a distance defined as the distance separating said base panel and said cover panel once assembled in the empty space.

* * * * *